US008201257B1

(12) United States Patent
Andres et al.

(10) Patent No.: US 8,201,257 B1
(45) Date of Patent: Jun. 12, 2012

(54) SYSTEM AND METHOD OF MANAGING NETWORK SECURITY RISKS

(75) Inventors: Steven G. Andres, Huntington Beach, CA (US); David M. Cole, Santa Monica, CA (US); Thomas Gregory Cummings, Laguna Niguel, CA (US); Roberto Ramon Garcia, San Antonio, TX (US); Brian Michael Kenyon, Aliso Viejo, CA (US); George R. Kurtz, Coto de Caza, CA (US); Stuart Cartier McClure, Ladera Ranch, CA (US); Christopher William Moore, Huntington Beach, CA (US); Michael J. O'Dea, Aliso Viejo, CA (US); Ken D. Saruwatari, Laguna Niguel, CA (US)

(73) Assignee: McAfee, Inc., Santa Clara, CA (US)

( * ) Notice: Subject to any disclaimer, the term of this patent is extended or adjusted under 35 U.S.C. 154(b) by 606 days.

(21) Appl. No.: 10/813,917

(22) Filed: Mar. 31, 2004

(51) Int. Cl.
*G06F 21/00* (2006.01)

(52) U.S. Cl. .......................... 726/25; 726/23

(58) Field of Classification Search .................. 713/201; 726/25
See application file for complete search history.

(56) References Cited

U.S. PATENT DOCUMENTS

| | | | |
|---|---|---|---|
| 4,954,941 A | 9/1990 | Redman | 364/200 |
| 4,999,806 A | 3/1991 | Chernow et al. | 364/900 |
| 5,175,732 A | 12/1992 | Hendel et al. | |
| 5,237,614 A | 8/1993 | Weiss | 380/23 |
| 5,581,764 A | 12/1996 | Fitzgerald et al. | 395/703 |
| 5,649,187 A | 7/1997 | Hornbuckle | 395/610 |
| 5,699,275 A | 12/1997 | Beasley et al. | 364/514 |
| 5,742,829 A | 4/1998 | Davis et al. | 395/712 |
| 5,764,913 A | 6/1998 | Jancke et al. | 395/200.54 |
| 5,771,347 A | 6/1998 | Grantz et al. | 395/186 |
| 5,781,534 A | 7/1998 | Perlman et al. | |
| 5,799,002 A | 8/1998 | Krishnan | 370/234 |
| 5,805,897 A | 9/1998 | Glowny | 395/712 |

(Continued)

FOREIGN PATENT DOCUMENTS

EP     477039     3/1992

(Continued)

OTHER PUBLICATIONS

Product information from GuardedNet Website, copyright 2003, www.guarded.net.

(Continued)

*Primary Examiner* — Nasser Goodarzi
*Assistant Examiner* — Carlton Johnson
(74) *Attorney, Agent, or Firm* — Patent Capital Group

(57) ABSTRACT

A security risk management system comprises a vulnerability database, an asset database, a local threat intelligence database and a threat correlation module. The vulnerability database comprises data about security vulnerabilities of assets on a network gathered using active or passive vulnerability assessment techniques. The asset database comprises data concerning attributes of each asset. The threat correlation module receives threat intelligence alerts that identify attributes and vulnerabilities associated with security threats that affect classes of assets. The threat correlation module compares asset attributes and vulnerabilities with threat attributes and vulnerabilities and displays a list of assets that are affected by a particular threat. The list can be sorted according to a calculated risk score, allowing an administrator to prioritize preventive action and respond first to threats that affect higher risk assets. The security risk management system provides tools for performing preventive action and for tracking the success of preventive action.

16 Claims, 6 Drawing Sheets

U.S. PATENT DOCUMENTS

| | | | |
|---|---|---|---|
| 5,809,329 A | 9/1998 | Lichtman et al. | 395/828 |
| 5,852,812 A | 12/1998 | Reeder | 705/39 |
| 5,854,794 A | 12/1998 | Pawlowski | 370/509 |
| 5,860,012 A | 1/1999 | Luu | 395/712 |
| 5,875,186 A | 2/1999 | Belanger et al. | |
| 5,881,236 A | 3/1999 | Dickey | |
| 5,892,903 A | 4/1999 | Klaus | |
| 5,919,247 A | 7/1999 | Van Hoff et al. | 709/217 |
| 5,931,946 A | 8/1999 | Terada et al. | 713/201 |
| 5,933,646 A | 8/1999 | Hendrickson et al. | 395/712 |
| 5,933,826 A | 8/1999 | Ferguson | 707/9 |
| 5,968,176 A | 10/1999 | Nessett et al. | |
| 5,974,454 A | 10/1999 | Apfel et al. | 709/221 |
| 5,987,611 A | 11/1999 | Freund | 713/201 |
| 5,991,802 A | 11/1999 | Allard et al. | 709/219 |
| 6,016,499 A | 1/2000 | Ferguson | 707/104 |
| 6,029,247 A | 2/2000 | Ferguson | 713/201 |
| 6,052,710 A | 4/2000 | Saliba et al. | 709/203 |
| 6,061,740 A | 5/2000 | Ferguson et al. | 709/246 |
| 6,073,214 A | 6/2000 | Fawcett | 711/133 |
| 6,078,945 A | 6/2000 | Hinsley | 709/105 |
| 6,094,679 A | 7/2000 | Teng et al. | 709/220 |
| 6,108,649 A | 8/2000 | Young et al. | 707/4 |
| 6,115,743 A | 9/2000 | Cowan et al. | |
| 6,138,157 A | 10/2000 | Welter et al. | 709/224 |
| 6,151,643 A | 11/2000 | Cheng et al. | 710/36 |
| 6,151,708 A | 11/2000 | Pedrizetti et al. | 717/11 |
| 6,157,618 A | 12/2000 | Boss et al. | 370/252 |
| 6,185,689 B1 | 2/2001 | Todd et al. | |
| 6,202,207 B1 | 3/2001 | Donohue | 717/11 |
| 6,205,552 B1 | 3/2001 | Fudge | 713/201 |
| 6,219,675 B1 | 4/2001 | Pal et al. | 707/201 |
| 6,229,540 B1 | 5/2001 | Tonelli et al. | |
| 6,243,766 B1 | 6/2001 | Sliger et al. | 710/2 |
| 6,256,668 B1 | 7/2001 | Slivka et al. | 709/220 |
| 6,263,362 B1 | 7/2001 | Donoho et al. | 709/207 |
| 6,266,774 B1 | 7/2001 | Sampath et al. | 713/201 |
| 6,269,456 B1 | 7/2001 | Hodges et al. | 714/38 |
| 6,272,677 B1 | 8/2001 | Lam et al. | 717/11 |
| 6,279,113 B1 | 8/2001 | Vaidya | 713/201 |
| 6,279,156 B1 | 8/2001 | Amberg et al. | 717/11 |
| 6,281,790 B1 | 8/2001 | Kimmel et al. | 340/506 |
| 6,282,175 B1 | 8/2001 | Steele et al. | 370/254 |
| 6,282,546 B1 | 8/2001 | Gleuchauf et al. | 707/102 |
| 6,282,709 B1 | 8/2001 | Reha et al. | 717/11 |
| 6,282,712 B1 | 8/2001 | Davis et al. | 717/11 |
| 6,298,445 B1 | 10/2001 | Shostack et al. | 713/201 |
| 6,301,668 B1 | 10/2001 | Gleichauf et al. | 713/201 |
| 6,307,841 B1 | 10/2001 | Rowles et al. | 370/252 |
| 6,311,278 B1 | 10/2001 | Raanan et al. | |
| 6,321,337 B1 | 11/2001 | Reshef et al. | |
| 6,324,656 B1 | 11/2001 | Gleichauf et al. | 714/37 |
| 6,334,190 B1 | 12/2001 | Silverbrook et al. | 713/500 |
| 6,347,375 B1 | 2/2002 | Reinert et al. | 713/200 |
| 6,380,851 B1 | 4/2002 | Gilbert et al. | |
| 6,408,391 B1 | 6/2002 | Huff et al. | |
| 6,415,321 B1 | 7/2002 | Gleichauf et al. | |
| 6,425,006 B1 | 7/2002 | Chari et al. | |
| 6,487,666 B1 | 11/2002 | Shanklin et al. | |
| 6,493,871 B1 | 12/2002 | McGuire et al. | 717/173 |
| 6,546,493 B1 | 4/2003 | Magdych et al. | 713/201 |
| 6,574,737 B1 | 6/2003 | Kingsford et al. | |
| 6,584,569 B2 | 6/2003 | Reshef et al. | |
| 6,684,253 B1 | 1/2004 | Whitaker et al. | |
| 6,704,874 B1 | 3/2004 | Porras et al. | |
| 6,718,359 B2 | 4/2004 | Zisapel et al. | |
| 6,721,713 B1 | 4/2004 | Guheen et al. | |
| 6,725,046 B2 | 4/2004 | Park | |
| 6,735,701 B1 | 5/2004 | Jacobson | |
| 6,751,661 B1 | 6/2004 | Geddes | 709/223 |
| 6,754,895 B1 | 6/2004 | Bartel et al. | 717/171 |
| 6,766,458 B1 | 7/2004 | Harris et al. | 713/201 |
| 6,785,821 B1 | 8/2004 | Teal | |
| 6,789,202 B1 | 9/2004 | Ko et al. | 713/201 |
| 6,859,793 B1 | 2/2005 | Lambiase | 705/59 |
| 6,862,581 B1 | 3/2005 | Lambiase | 705/51 |
| 6,920,558 B2 | 7/2005 | Sames et al. | 713/166 |
| 6,947,398 B1 | 9/2005 | Ahmed et al. | |
| 6,957,348 B1 | 10/2005 | Flowers et al. | |
| 6,976,068 B2 | 12/2005 | Kadam et al. | 709/223 |
| 6,988,208 B2 | 1/2006 | Hrabik et al. | |
| 6,990,660 B2 | 1/2006 | Moshir et al. | |
| 7,000,247 B2 | 2/2006 | Banzhof | 726/2 |
| 7,003,561 B1 | 2/2006 | Magdych et al. | 709/223 |
| 7,024,548 B1 | 4/2006 | O'Toole | |
| 7,058,968 B2 | 6/2006 | Rowland et al. | |
| 7,069,581 B2 | 6/2006 | Fu et al. | 726/3 |
| 7,073,198 B1 | 7/2006 | Flowers et al. | |
| 7,089,589 B2 | 8/2006 | Chefalas et al. | 726/22 |
| 7,096,498 B2 | 8/2006 | Judge | |
| 7,096,502 B1 | 8/2006 | Fox et al. | |
| 7,096,503 B1 | 8/2006 | Magdych et al. | 726/25 |
| 7,124,181 B1 | 10/2006 | Magdych et al. | 709/224 |
| 7,146,642 B1 | 12/2006 | Magdych et al. | 726/22 |
| 7,152,105 B2 | 12/2006 | McClure et al. | 709/224 |
| 7,243,148 B2 | 7/2007 | Keir et al. | |
| 7,257,630 B2 | 8/2007 | Cole et al. | |
| 7,260,844 B1 * | 8/2007 | Tidwell et al. | 726/22 |
| 7,290,275 B2 | 10/2007 | Baudoin et al. | |
| 7,308,712 B2 | 12/2007 | Banzhof | |
| 7,346,922 B2 | 3/2008 | Miliefsky | |
| 7,536,456 B2 | 5/2009 | Williams et al. | |
| 7,543,056 B2 | 6/2009 | McClure et al. | |
| 7,624,422 B2 | 11/2009 | Williams et al. | |
| 7,627,891 B2 | 12/2009 | Williams et al. | |
| 7,664,845 B2 | 2/2010 | Kurtz et al. | |
| 7,673,043 B2 | 3/2010 | Keir et al. | |
| 7,680,880 B2 | 3/2010 | Landfield | |
| 7,823,147 B2 | 10/2010 | Moshir et al. | |
| 8,091,117 B2 | 1/2012 | Williams et al. | |
| 2001/0014150 A1 | 8/2001 | Beebe et al. | 379/189 |
| 2001/0020254 A1 | 9/2001 | Blumenau et al. | |
| 2001/0034847 A1 | 10/2001 | Gaul, Jr. | 713/201 |
| 2001/0049793 A1 | 12/2001 | Sugimoto | |
| 2002/0005092 A1 | 1/2002 | Collins et al. | |
| 2002/0010679 A1 | 1/2002 | Felsher | |
| 2002/0010855 A1 | 1/2002 | Reshef et al. | |
| 2002/0019945 A1 | 2/2002 | Houston et al. | |
| 2002/0026591 A1 | 2/2002 | Hartley et al. | 713/201 |
| 2002/0035542 A1 | 3/2002 | Tumey et al. | |
| 2002/0053020 A1 | 5/2002 | Teijido et al. | |
| 2002/0061001 A1 | 5/2002 | Garcia-Luna-Aceves et al. | |
| 2002/0068559 A1 | 6/2002 | Sharma et al. | |
| 2002/0082778 A1 | 6/2002 | Barnett et al. | 702/1 |
| 2002/0083337 A1 | 6/2002 | Welcher et al. | |
| 2002/0087882 A1 | 7/2002 | Schneier et al. | 713/201 |
| 2002/0100036 A1 | 7/2002 | Moshir et al. | 717/173 |
| 2002/0103658 A1 | 8/2002 | Angal et al. | |
| 2002/0104014 A1 | 8/2002 | Zobel et al. | |
| 2002/0116639 A1 | 8/2002 | Chefalas et al. | 713/201 |
| 2002/0138271 A1 | 9/2002 | Shaw | 704/270 |
| 2002/0147803 A1 | 10/2002 | Dodd et al. | 709/223 |
| 2002/0178382 A1 | 11/2002 | Mukai et al. | |
| 2002/0178383 A1 | 11/2002 | Hrabick et al. | |
| 2002/0184533 A1 | 12/2002 | Fox | |
| 2002/0188481 A1 | 12/2002 | Berg et al. | 705/4 |
| 2003/0014664 A1 | 1/2003 | Hentunen | |
| 2003/0028803 A1 | 2/2003 | Bunker, V et al. | |
| 2003/0046128 A1 | 3/2003 | Heinrich | |
| 2003/0056113 A1 | 3/2003 | Korosec | 713/200 |
| 2003/0056116 A1 | 3/2003 | Bunker, V et al. | |
| 2003/0061506 A1 | 3/2003 | Cooper et al. | |
| 2003/0065942 A1 | 4/2003 | Lineman et al. | |
| 2003/0101353 A1 | 5/2003 | Tarquini et al. | |
| 2003/0120935 A1 | 6/2003 | Teal et al. | |
| 2003/0126472 A1 | 7/2003 | Banzhof | 713/201 |
| 2003/0135749 A1 | 7/2003 | Gales et al. | 713/200 |
| 2003/0140250 A1 | 7/2003 | Taninaka et al. | 713/201 |
| 2003/0154269 A1 | 8/2003 | Nyanchama et al. | |
| 2003/0163728 A1 | 8/2003 | Shaw | 713/201 |
| 2003/0172145 A1 | 9/2003 | Nguyen | |
| 2003/0188189 A1 | 10/2003 | Desai et al. | |
| 2003/0195861 A1 | 10/2003 | McClure et al. | |
| 2003/0196097 A1 | 10/2003 | Korosec et al. | |
| 2003/0196123 A1 | 10/2003 | Rowland et al. | |
| 2003/0200357 A1 | 10/2003 | Yanosy | |
| 2003/0204632 A1 | 10/2003 | Willebeek-LeMair et al. | |

| | | | |
|---|---|---|---|
| 2003/0208606 | A1 | 11/2003 | Maguire et al. |
| 2003/0212779 | A1 | 11/2003 | Boyter et al. |
| 2003/0212909 | A1 | 11/2003 | Chandrashekhar et al. |
| 2003/0217039 | A1 | 11/2003 | Kurtz et al. |
| 2003/0220940 | A1 | 11/2003 | Futoransky et al. |
| 2003/0233438 | A1* | 12/2003 | Hutchinson et al. ......... 709/223 |
| 2004/0003266 | A1 | 1/2004 | Moshir et al. ................. 713/191 |
| 2004/0010709 | A1 | 1/2004 | Baudoin et al. ............... 713/201 |
| 2004/0015728 | A1 | 1/2004 | Cole et al. |
| 2004/0019803 | A1 | 1/2004 | Jahn ............................. 713/201 |
| 2004/0042470 | A1 | 3/2004 | Cooper et al. |
| 2004/0064731 | A1* | 4/2004 | Nguyen et al. ................ 713/201 |
| 2004/0073810 | A1 | 4/2004 | Dettinger et al. |
| 2004/0078384 | A1 | 4/2004 | Keir et al. |
| 2004/0098621 | A1 | 5/2004 | Raymond .................... 713/201 |
| 2004/0103309 | A1* | 5/2004 | Tracy et al. .................. 713/201 |
| 2004/0111643 | A1 | 6/2004 | Farmer |
| 2004/0117478 | A1 | 6/2004 | Triulzi et al. |
| 2004/0123145 | A1 | 6/2004 | Baffes et al. |
| 2004/0143753 | A1 | 7/2004 | Hernacki et al. ............. 713/200 |
| 2004/0170153 | A1 | 9/2004 | Stewart et al. ................ 370/338 |
| 2004/0187032 | A1 | 9/2004 | Gels et al. |
| 2004/0221178 | A1 | 11/2004 | Aaron et al. .................. 713/201 |
| 2004/0225524 | A1 | 11/2004 | Narasimhan et al. |
| 2004/0250116 | A1 | 12/2004 | Strickland et al. |
| 2005/0008001 | A1 | 1/2005 | Williams et al. |
| 2005/0010821 | A1 | 1/2005 | Cooper et al. ................ 713/201 |
| 2005/0015622 | A1 | 1/2005 | Williams et al. |
| 2005/0015623 | A1 | 1/2005 | Williams et al. |
| 2005/0022012 | A1 | 1/2005 | Bluestone et al. |
| 2005/0022028 | A1 | 1/2005 | Hall |
| 2005/0044037 | A1 | 2/2005 | Lawrence et al. .............. 705/38 |
| 2005/0044389 | A1 | 2/2005 | Oliphant ...................... 713/187 |
| 2005/0091542 | A1 | 4/2005 | Banzhof |
| 2005/0111466 | A1 | 5/2005 | Kappes et al. ................ 370/400 |
| 2005/0125685 | A1 | 6/2005 | Samuelsson et al. ......... 713/200 |
| 2005/0138433 | A1 | 6/2005 | Linetsky ...................... 713/202 |
| 2005/0188419 | A1 | 8/2005 | Dadhia et al. .................... 726/1 |
| 2005/0201297 | A1 | 9/2005 | Peikari ......................... 370/242 |
| 2005/0216957 | A1 | 9/2005 | Banzhof et al. ................ 726/25 |
| 2005/0257267 | A1 | 11/2005 | Williams et al. |
| 2006/0080653 | A1 | 4/2006 | Siwatu et al. |
| 2006/0101517 | A1 | 5/2006 | Banzhof et al. ................ 726/25 |
| 2006/0136327 | A1* | 6/2006 | You ................................ 705/38 |
| 2006/0191012 | A1 | 8/2006 | Banzhof et al. ................ 726/25 |
| 2006/0206757 | A1 | 9/2006 | Russell et al. |
| 2006/0282388 | A1 | 12/2006 | Solomon et al. ............... 705/52 |
| 2007/0011319 | A1 | 1/2007 | McClure et al. |
| 2007/0016955 | A1 | 1/2007 | Goldberg et al. |
| 2007/0162973 | A1 | 7/2007 | Schneier et al. |
| 2007/0250595 | A1 | 10/2007 | Landfield |
| 2007/0283007 | A1 | 12/2007 | Keir et al. |
| 2007/0283441 | A1 | 12/2007 | Cole et al. |
| 2009/0259748 | A1 | 10/2009 | McClure et al. |
| 2011/0029966 | A1 | 2/2011 | Moshir et al. |

FOREIGN PATENT DOCUMENTS

| | | |
|---|---|---|
| EP | 1143665 | 10/2001 |
| WO | WO 99/67931 | 12/1999 |
| WO | WO 01/65330 | 9/2001 |
| WO | WO 03/058457 | 7/2003 |
| WO | WO 03/060717 | 7/2003 |
| WO | WO 2005/094490 | 10/2005 |
| WO | WO 2006/049841 | 5/2006 |
| WO | WO 2006/091425 | 8/2006 |

OTHER PUBLICATIONS

Product information from ArcSight Website, www.arcsight.com.
"About CVE: Common Vulnerabilities and Exposures (CVE) is:" http://www.cve.mitre.org/about/ Mar. 22, 2004.
Request for Reexamination of U.S. Patent No. 7,000,247 filed on Mar. 2, 2006.
Office Action Summary from U.S. Appl. No. 10/810,927 which was mailed on Dec. 15, 2006.
Office Action Summary from U.S. Appl. No. 10/975,828 which was mailed on Nov. 15, 2006.
U.S. Appl. No. 11/009,782, filed Dec. 10, 2004.
U.S. Appl. No. 11/410,730, filed Apr. 25, 2006.
Wolfe et al., "Maintaining remote services and resources over the Internet and other networks" Jun. 10-12, 2002; IEEE, p. 137-138.
Peng Lui; "Engineering a distributed intrusion tolerant database system using COTS components" IEEE, vol. 2, Apr. 22-24, 2003, p. 284-289.
International Search Report and Written Opinion from PCT Application No. US05/09689 mailed Jan. 25, 2007.
CERT® Advisories, "CERT/CC Advisories 1988-200" http://web.archive.org/web/20000815055129/http://www.cert.org/advisories/ 2000, p. 1-34.
"Review SPQUERY", in Network Computing, Nov. 2000 www.networkcomputer.co.uk/back_iss/prod_update/reviews/spquery4.1.htm.
"Ready for Windows 2000 Service Pack 1? St. Bernards Software's SPQuery 4.0 is Here Just in Time," Business Wire, Aug. 2, 2000, www.findarticles.com/p/articles/mi_m0EIN/is_August_2/ai_63819686/print.
Edwards, Mark Joseph, "Useful SPQuery 3.0 automates Finding, installing hotfixes," Infoworld, Jun. 21, 1999 www.infoworld.com/cgi-bin/displayArchive.pl?/99/25/c04-25.46htm.
SPQuery Users Manuel, 1st. Quarter 2001.
WebConsole Core 4.0 for NetWare, archived May 11, 2000 Web.archive.org/web/200005111133746/www.patchlink.com/products/wenw_product . . . .
"Gravitix The Patch Finder" archived Aug. 15, 2000 web.archive.org/web/20000815094824/www.patchlink.com/products/gravitix.asp.
"Network Vulnerability Assessment Report" archived Sep. 17, 2000 web.archive.org/web/20000917072109/documents.iss.net/literature/InternetScanner/reports/Line_Mgmt_Vulnerability_Assessment_Report.pdf.
"Host Vulnerability Summary Report" archived Sep. 17, 2000 web.archive.org/web/20000917072216/documents.iss.net/literature/InternetScanner/reports/Technician_Host-Vulnerability_Summary_Report.pdf.
"ISS SAFEsuite prodict: Internet Scanner" archived Aug. 20, 2000 web.archive.org/web/2000082023428/www.iss.net/securing_e-business/security_pr . . . .
"To Setup Secure PC Network" archived Aug. 16, 2000 web.archive.org/web/20000816192628/www.citadel.com/downloads/SPC+readme.txt.
"Microsoft Security Glossary" Oct. 29, 2002 www.microsoft.com/security/glossary.mspx.
Stephen Swoyer, Hotfix Management Tools Maturing Nov. 19, 2001, ENT News.
"Systems Management Server Product Overview, Features" www.microsoft.com; Jan. 29, 2002.
Novel ZENworks Grows Up, Feb. 7, 2000.
www.thestandard.com article, Dec. 21, 2000.
Topaz white paper; copyright date 2000.
Topaz news release; Oct. 4, 1999.
www.freshtech.com web pages, pp. 1-8; copyright date 1996-2000.
"Benefits of Software Leasing"; Dec. 15, 1998.
"Leasing Software"; no later than Feb. 27, 2001.
Timbale pp. 1-4; Dec. 21, 2000.
"The Open Software Description Format (OSD)"; Aug. 11, 1997.
Computer Associate ManageIT news release; May 8, 2000.
www.sitepartrol.com pp. 1-2; no later than Nov. 28, 2001.
www/rhsolution.com pp. 1-4; no later than Jan. 8, 2001.
www.hotelhelpdesk.com pp. 1-4, no later than Jan. 8, 2001.
InfraDesk™ page; Dec. 21, 2000.
www.triactive.com page; no later than Nov. 28, 2001.
Webopedia.com definitions; copyright date 2001.
Technical Comparison of Systems Management Server 2.0 and Novell's ZENworks 2.0; copyright date 2000.
SafePatch Description , pp. 1-3; Oct. 2000.
SafePatch; Oct. 2000.
Marimba Castanet; copyright 2000.
www.shavlik.com pp. 1-12; copyright date 2001.
HFNetChk, pp. 1-21; copyright date 2001.
Welcome to Windows Update page; copyright date 2001.
Shipley, G. "Tools From the Underground", May 29, 2000.
Sourceforge.net pp. 1-2; copyright date 1999, 2000, 2001.

Robinson, C., "Patchlink.com Brings Remote Management Online", Dec. 4, 2000.
Coopee, "Building a strong foundation", Network World Fusion, Jan. 31, 2000.
"Q. What is Qchain.exe?" www.ntfaq.com; Jul. 23, 2001.
"Newly Released Patchlink Update 4.0 . . ." biz.yahoo.com; Oct. 14, 2002.
Burnback, "Patching up bad patches" www.zdnet.com; Nov. 22, 2002.
Mueller, "Patchlink Helps Keep Windows Closed" www.netowrkcomputing.com; Sep. 2, 2002.
Patchlink® Update™ 4.0 White Paper: Cross-platform Security Patch Management; Copyright date 2002.
Pages numbered as 1-27, from www.bigfix.com; no later than Nov. 25, 2002.
"UpdateEXPERT: Product Reviews & Testimonials" www.stbernard.com.
"SPQuery v4.1", www.networkcomputin.co.uk Nov. 2000.
"Ahead of the Service Pack", www.networkcomputing.co.uk ; Nov. 2000.
U.S. Appl. No. 10/975,828, filed Oct. 28, 2004.
U.S. Appl. No. 10/810,927, filed Mar. 25, 2004.
Moshir et al., "Non-invasive Automatic Offsite Updating System and Method" U.S. Appl. No. 60/234,680, filed Sep. 22, 2000.
CERT® Incident Notes IN-2000-07, "Exploitation of Hidden File Extensions," CERT Software Engineering Institute, Carnegie Mellon University, Jul. 27, 2000.
International Preliminary Report on Patentability in PCT Application No. PCT/US05/009689 issued on Feb. 13, 2007.
Non-Final Office Action in U.S. Appl. No. 10/335,490 mailed on Nov. 18, 2004.
Response to Non-Final Office Action dated Nov. 18, 2004 in U.S. Appl. No. 10/335,490 filed on Dec. 10, 2004.
Examiner Interview Summary in U.S. Appl. No. 10/335,490 mailed on Dec. 21, 2004.
Non-Final Office Action in U.S. Appl. No. 10/335,490 mailed on Mar. 23, 2005.
Response to Non-Final Office Action dated Mar. 23, 2005 in U.S. Appl. No. 10/335,490 filed on May 4, 2005.
Supplemental Amendment to Non-Final Action dated Mar. 23, 2005 in U.S. Appl. No. 10/335,490 filed on Jun. 30, 2005.
Examiner Interview Summary in U.S. Appl. No. 10/335,490 mailed on Aug. 29, 2005.
Notice of Allowance, Notice of Allowability, and Examiner's Interview Summary in U.S. Appl. No. 11/335,490 mailed on Sep. 22, 2005.
Reexamination of U.S. Patent No. 7,000,247 filed as U.S. Reexamination Control No. 90/007,955 on Mar. 2, 2006.
Non-Final Office Action in U.S. Appl. No. 10/009,782 mailed on Jun. 4, 2007.
Response to Non-Final Office Action dated Jun. 4, 2007 in U.S. Appl. No. 10/009,782, filed Aug. 3, 2007.
Notice of Allowance in U.S. Appl. No. 10/009,782 mailed on Aug. 24, 2007.
Reexamination of U.S. Patent No. 7,308,712 filed as U.S. Reexamination Application Control No. 90/009,120 on May 29, 2008.
Examiner Interview Summary in U.S. Appl. No. 10/810,927 mailed on Feb. 9, 2007.
Response to Non-Final Office Action dated Dec. 15, 2006 in U.S. Appl. No. 10/810,927 filed on Feb. 22, 2007.
Final Office Action in U.S. Appl. No. 10/810,927 mailed on May 2, 2007.
Response to Final Office Action dated May 2, 2007 in U.S. Appl. No. 10/810,927 filed on Jun. 28, 2007.
Notice of Non-Compliant Amendment in U.S. Appl. No. 10/810,927 mailed on Jul. 13, 2007.
Response to Notice of Non-Compliant Amendment dated Jul. 13, 2007 in U.S. Appl. No. 10/810,927 filed on Jul. 18, 2007.
Advisory Action in U.S. Appl. No. 10/810,927 mailed on Oct. 3, 2007.
Notice of Abandonment in U.S. Appl. No. 10/810,927 mailed on Feb. 27, 2007.

Non-Final Office Action in U.S. Appl. No. 10/050,675 mailed on Jan. 20, 2006.
Response to Non-Final Office Action dated Jan. 20, 2006 in U.S. Appl. No. 10/050,675 filed on Apr. 17, 2006.
Notice of Allowance in U.S. Appl. No. 10/050,675 mailed on Jul. 17, 2006.
Supplemental Notice of Allowance in U.S. Appl. No. 10/050,675 mailed on Sep. 27, 2006.
Non-Final Office Action in U.S. Appl. No. 11/521,113 mailed on May 16, 2008.
Response to Non-Final Office Action dated May 16, 2008 in U.S. Appl. No. 11/521,113 filed on Aug. 18, 2008.
Notice of Allowance and Examiner Interview Summary in U.S. Appl. No. 11/521,113 mailed on Dec. 2, 2008.
Non-Final Office Action in U.S. Appl. No. 11/521,113 mailed on Dec. 29, 2008.
312 Amendment in in U.S. Appl. No. 11/521,113 filed on Mar. 2, 2009.
Applicant Summary of Interview with Examiner in U.S. Appl. No. 12/476,082 filed on Jan. 21, 2011.
Notice of Allowance and Examiner Interview Summary in U.S. Appl. No. 12/476,082 filed on Feb. 9, 2011.
Request for Continued Examination in U.S. Appl. No. 12/476,082 filed on Feb. 25, 2011.
Notice of Allowance in U.S. Appl. No. 12/476,082 mailed on Mar. 10, 2011.
Request for Continued Examination and Amendment in U.S. Appl. No. 12/476,082 filed on Jun. 10, 2011.
Non-Final Office Action in U.S. Appl. No. 10/387,221 mailed on Sep. 22, 2006.
Response to Non-Final Office Action dated Sep. 22, 2006 in U.S. Appl. No. 10/387,221 filed on Dec. 22, 2006.
Notice of Allowance in U.S. Appl. No. 10/387,221 mailed on Feb. 14, 2007.
Non-Final Office Action in U.S. Appl. No. 11/748,445 mailed on Mar. 9, 2010.
Response to Non-Final Office Action dated Mar. 9, 2010 in U.S. Appl. No. 11/748,445 filed on Jun. 9, 2010.
Final Office Action in U.S. Appl. No. 11/748,445 mailed on Aug. 20, 2010.
Response to Final Office Action dated Aug. 20, 2010 in U.S. Appl. No. 11/748,445 filed on Jan. 20, 2011.
Examiner Interview Summary in U.S. Appl. No. 11/748,445 mailed on Feb. 4, 2011.
Examiner Interview Summary in U.S. Appl. No. 11/748,445 mailed on Feb. 7, 2011.
Applicant Summary of Interview with Examiner in U.S. Appl. No. 11/748,445 filed on Feb. 9, 2011.
Advisory Action in n U.S. Appl. No. 11/748,445 mailed on Feb. 18, 2011.
Request for Continued Examination in U.S. Appl. No. 11/748,439 filed on Feb. 18, 2011.
Notice of Allowance in U.S. Appl. No. 11/748,439 filed on Mar. 16, 2011.
Request for Continued Examination in U.S. Appl. No. 11/748,439 filed on Jun. 13, 2011.
Non-Final Office Action in U.S. Appl. No. 10/387,358 mailed on Dec. 19, 2005.
Response to Non-Final Office Action dated Dec. 19, 2005 in U.S. Appl. No. 10/387,358 filed on Mar. 20, 2006.
Non-Final Office Action in U.S. Appl. No. 10/387,358 mailed on Nov. 17, 2006.
Response to Non-Final Office Action dated Nov. 17, 2006 in U.S. Appl. No. 10/387,358 filed on Feb. 20, 2007.
Final Office Action in U.S. Appl. No. 10/387,358 mailed on Apr. 23, 2007.
Response to Final Office Action dated Apr. 23, 2007 in U.S. Appl. No. 10/387,358 filed on Jun. 25, 2007.
Supplemental Response to Final Office Action dated Apr. 23, 2007 in U.S. Appl. No. 10/387,358 filed on Jul. 2, 2007.
Advisory Action in U.S. Appl. No. 10/387,358 mailed on Aug. 2, 2007.
Notice of Appeal in U.S. Appl. No. 10/387,358 filed on Sep. 24, 2007.

Appeal Brief Filed in U.S. Appl. No. 10/387,358 filed on Jan. 24, 2008.
Notice of Defective Appeal Brief in U.S. Appl. No. 10/387,358 mailed on Jul. 8, 2008.
Appeal Brief Filed in U.S. Appl. No. 10/387,358 filed on Jul. 23, 2008.
Non-Final Office Action in U.S. Appl. No. 10/387,358 filed on Sep. 29, 2008.
Response to Non-Final Office Action dated Sep. 29, 2008 in U.S. Appl. No. 10/387,358 filed on Jan. 29, 2009.
Final Office Action in U.S. Appl. No. 10/387,358 mailed on Apr. 2, 2009.
Request for Continued Examination and Amendment in U.S. Appl. No. 10/387,358 filed on Jul. 2, 2009.
Notice of Allowance and Examiner Interview Summary in U.S. Appl. No. 10/387,358 mailed on Sep. 17, 2009.
Supplemental Notice of Allowance in U.S. Appl. No. 10/387,358 mailed on Nov. 4, 2009.
312 Amendment in U.S. Appl. No. 10/387,358 filed on Dec. 17, 2009.
Non-Final Office Action in U.S. Appl. No. 10/387,223 mailed on Sep. 22, 2006.
Response to Non-Final Office Action dated Sep. 22, 2006 in U.S. Appl. No. 10/387,223 filed on Dec. 22, 2006.
Notice of Allowance in U.S. Appl. No. 10/387,223 mailed on Feb. 14, 2007.
Non-Final Office Action in U.S. Appl. No. 11/748,445 mailed on Jul. 24, 2009.
Response to Non-Final Office Action dated Jul. 24, 2009 in U.S. Appl. No. 11/748,445 filed on Oct. 26, 2009.
Notice of Allowance in U.S. Appl. No. 11/748,445 filed on Dec. 28, 2009.
Examiner Interview Summary in U.S. Appl. No. 10/975,828 mailed on Feb. 9, 2007.
Response to Non-Final Action dated Nov. 15, 2006 in U.S. Appl. No. 10/975,828 filed on Feb. 14, 2007.
Final Office Action in U.S. Appl. No. 10/975,828 mailed on May 17, 2007.
Response to Final Office Action in U.S. Appl. No. 10/975,828 mailed on Jul. 13, 2007.
Advisory Action in U.S. Appl. No. 10/975,828 mailed on Aug. 1, 2007.
Notice of Abandonment in U.S. Appl. No. 10/975,828 mailed on Dec. 27, 2007.
Notice of Allowance in U.S. Appl. No. 11/748,439 mailed on Jun. 22, 2011.
Non-Final Office Action in U.S. Appl. No. 10/778,770 mailed on Apr. 26, 2007.
Response to Non-Final Action dated Apr. 26, 2007 in U.S. Appl. No. 10/778,770 filed on Jul. 24, 2007.
Non-Final Office Action in U.S. Appl. No. 10/778,770 mailed on Sep. 26, 2007.
Response to Non-Final Office Action dated Sep. 26, 2007 in U.S. Appl. No. 10/778,770 filed on Jan. 28, 2008.
Final Office Action in U.S. Appl. No. 10/778,770 Mailed on Apr. 30, 2008.
RCE and Amendment filed in Response to Final Office Action dated Apr. 30, 2008 in U.S. Appl. No. 10/778,770 filed on Jul. 30, 2008.
Non-Final Office Action in U.S. Appl. No. 10/778,770 mailed on Oct. 14, 2008.
Response to Non-Final Office Action dated Oct. 14, 2008 in U.S. Appl. No. 10/778,770 filed on Jan. 14, 2009.
Final Office Action in U.S. Appl. No. 10/778,770 mailed on Apr. 2, 2009.
Notice of Appeal and Appeal Brief in U.S. Appl. No. 10/778,770 filed on Jul. 2, 2009.
Examiner's Answer to Appeal Brief in U.S. Appl. No. 10/778,770 mailed Oct. 15, 2009.
Reply Brief in U.S. Appl. No. 10/778,770 as filed on Jan. 15, 2010.
Non-Final Office Action in U.S. Appl. No. 10/778,779 mailed on Apr. 30, 2007.
Reponses to Non-Final Office Action dated Jul. 30, 2007 in U.S. Appl. No. 10/778,779 filed on Jul. 30, 2007.
Non-Final Office Action in U.S. Appl. No. 10/778,779 mailed on Nov. 14, 2007.
Response to Non-Final Office Action dated Nov. 14, 2007 in U.S. Appl. No. 10/778,779 filed on Mar. 14, 2008.
Final Office Action in U.S. Appl. No. 10/778,779 mailed on Jul. 11, 2008.
Response to Final Office Action dated Jul. 11, 2008 in U.S. Appl. No. 10/778,779 filed on Sep. 11, 2008.
Request for Continued Examination and Amendment in U.S. Appl. No. 10/778,779 filed on Oct. 13, 2008.
Office Action Summary in U.S. Patent Application No. 10/778,779 mailed on Jan. 8, 2009.
Advisory Acton in U.S. Appl. No. 10/778,779 mailed on Sep. 29, 2008.
Request for Continued Examination and Amendment filed in U.S. Appl. No. 10/778,779 on Oct. 13, 2008.
Non-Final Action in U.S. Appl. No. 10/778,779 mailed on Jan. 8, 2009.
Response to Non-Final Office Action dated Jan. 8, 2009 in U.S. Appl. No. 10/778,779 filed on Apr. 8, 2009.
Final Office Action in U.S. Appl. No. 10/778,779 mailed on Jul. 10, 2009.
Request for Continued Examination and Amendment filed in U.S. Appl. No. 10/778,779 on Nov. 10, 2009.
Non-Final Office Action in U.S. Appl. No. 10/778,779 mailed on Jan. 25, 2010.
Response to Non-Final Office Action dated Jan. 25, 2010 in U.S. Appl. No. 10/778,779 filed on Jun. 25, 2010.
Final Office Action in U.S. Appl. No. 10/778,779 mailed Sep. 15, 2010.
Response to Final Office Action dated Sep. 15, 2010 in U.S. Appl. No. 10/778,779 filed on Sep. 15, 2010.
Advisory Action in U.S. Appl. No. 10/778,779 mailed Dec. 3, 2010.
Notice of Appeal in U.S. Appl. No. 10/778,779 filed on Feb. 15, 2011.
Request for Continued Examination and Amendment in U.S. Appl. No. 10/778,779 filed on Apr. 15, 2011.
Non-Final Office Action in U.S. Appl. No. 10/778,836 mailed on Sep. 10, 2007.
Response to Non-Final Action dated Sep. 10, 2007 in U.S. Appl. No. 10/778,836 filed on Dec. 10, 2007.
Final Office Action in U.S. Appl. No. 10/778,836 mailed on Mar. 17, 2008.
Request for Continued Examination and Amendment in U.S. Appl. No. 10/778,836 filed on Jun. 17, 2008.
Non-Final Office Action in U.S. Appl. No. 10/778,836 mailed on Sep. 3, 2008.
Response to Non-Final Action dated Sep. 3, 2008 in U.S. Appl. No. 10/778,836 filed on Dec. 3, 2008.
Notice of Allowance in U.S. Appl. No. 10/778,836 mailed on Jan. 9, 2009.
Non-Final Office Action in U.S. Appl. No. 10/778,837 mailed on Sep. 24, 2007.
Response to Non-Final Office Action dated Sep. 24, 2007 in U.S. Appl. No. 10/778,837 filed on Jan. 24, 2008.
Final Office Action in U.S. Appl. No. 11/778,837 mailed on Mar. 5, 2008.
Request for Continued Examination and Amendment in U.S. Appl. No. 11/778,837 filed on Jun. 5, 2008.
Non-Final Office Action in U.S. Appl. No. 10/778,837 mailed on Jul. 3, 2008.
Response to Non-Final Office Action dated Jul. 3, 2008 in U.S. Appl. No. 11/778,837 filed on Sep. 22, 2008.
Final Office Action in U.S. Appl. No. 10/778,837 mailed on Dec. 16, 2008.
Pre-Brief Conference Request and Notice of Appeal in U.S. Appl. No. 10/778,837 filed on Mar. 16, 2009.
Pre-Brief Conference Decision in U.S. Appl. No. 10/778,837 mailed on Apr. 8, 2009.
Examiner Interview Summary in U.S. Appl. No. 10/778,837 mailed on Jun. 10, 2009.
Notice of Allowance in U.S. Appl. No. 10/778,837 mailed on Jun. 29, 2009.

Non-Final Office Action in U.S. Appl. No. 10/779,190 mailed on Sep. 18, 2007.
Response to Non-Final Office Action dated Sep. 18, 2007 in U.S. Appl. No. 10/779,190 filed Jan. 18, 2008.
Final Office Action in U.S. Appl. No. 10/779,190 mailed on Apr. 29, 2008.
Request for Continued Examination and Amendment in U.S. Appl. No. 10/779,190 filed on Jul. 29, 2008.
Non-Final Office Action in U.S. Appl. No. 10/779,190 mailed on Sep. 26, 2008.
Response to Non-Final Action dated Sep. 26, 2008 in U.S. Appl. No. 10/779,190 filed Jan. 26, 2009.
Notice of Allowance and Examiner Interview Summary in U.S. Appl. No. 10/779,190 mailed May 18, 2009.
Non-Final Office Action in U.S. Appl. No. 11/410,730 mailed on Apr. 29, 2009.
Response to Non-Final Office Action dated Apr. 29, 2009 in U.S. Appl. No. 11/410,730 filed on Aug. 31, 2009.
Notice of Allowance in U.S. Appl. No. 11/410,730 mailed on Dec. 16, 2009.
312 Amendment in U.S. Appl. No. 11/410,730 filed on Jan. 14, 2010.
"Active Watch: Hosted Web Performance Monitoring Service"; copyright date 2000. (Cited in U.S. Appl. No. 10/335,490).
"ASPs: Leasing software"; copyright date 2000-2001. (Cited in U.S. Appl. No. 10/335,490).
Craig Smith and Peter Grundl, Know Your Enemy: Passive Fingerprinting, Sep. 3, 2001, available at <http://www.project.honeynet.org/papers/finger/>.
Fyodor, "Remote OS detection via TCP/IP Stack FingerPrinting," Oct. 18, 1998, retrieved from http://nmap.org/nmap-fingerprinting-article.txt on Feb. 25, 2011.
Fyodor, The Art of Port Scanning, Phrack Magazine, vol. 7, Issue 51, Sep. 1, 1997*, available at <http://www.insecure.org/nmap/p51-11.txt>.
"Internet Security Systems Internet Scanner", archived Jun. 6, 2001 in Web.archive.org., web.archive.org/web/2001060422406/documents.iss.net/literature/InternetSc- anner/is.sub.--ps. pdf. (Cited in U.S. Appl. No. 11/009,782).
Magic Solutions®, The Leader in Service Management, © 2003, 8 pages.
Magic Total Service Desk, brochure dated Apr. 2001, 2 pages.
Marshall Beddoe and Christopher Abad, The Siphon Project: An Implementation of Stealth Target Acquisition & Information Gathering Methodologies, Blackhat USA Conference 2001, presented Jul. 11, 2001*, available at <http://www.blackhat.com/html/bh-usa-01/bh-usa-01-speakers.html>.
"Microsoft Security Glossary", www.microsoft.com/security/glossary.mspx, published Oct. 29, 2002, updated Dec. 19, 2005.
Spitzner, L., "Passive Fingerprinting Symantec Connect", May 2, 2002, retrieved from www.securityfocus.com/infocus/1224 on Feb. 25, 2011.
"Systems Management Server Product Overview, Features", from www.Microsoft.com; Jan. 29, 2002, Feb. 8, 1999.
Fonseca, B., "Web performance tools get upgrade"; Aug. 29, 2000.
Freshwater Software news release; Jan. 18, 1998.
Kearns, D., "Patch tracking"; Jun. 27, 2001.
Manzuik, Steve, "Ultimate Security Toolkit", in NTSecurity, May 16, 2000, web.archive.org/web/2001160751/www.ntsecurity.net/Articles/Index.cfm?ArticleId=92902&SearchString=cyber.
NetworkDeltaWebs$^{SM}$ page; copyright date 2000. (Cited in U.S. Appl. No. 10/335,490).
PatchLink Menu: Gravitix Overview; copyright date 2001. (Cited in U.S. Appl. No. 10/335,490).
PatchLink Press Release; Jun. 18, 2001. (Cited in U.S. Appl. No. 10/335,490).
PatchLink Press Release; Mar. 27, 2000. (Cited in U.S. Appl. No. 10/335,490).
Proctor; no later than Jan. 8, 2001. (Cited in U.S. Appl. No. 10/335,490).
"Remedy Customer Relationship Solutions™," May 1999, 46 sheets (two pages per sheet).
St. Bernard, St. Bernard Software Simplifies NT Service Pack Management with SPQuery, Apr. 20, 2000 Business Wire.
Sturdevant, C., "ZENWorks Cuts Legwork in NetWare Shops"; Mar. 13, 2000. (Cited in U.S. Appl. No. 10/335,490).
winfingerprint pp. 1-3; no later than Sep. 10, 2001.
www.microsoft.com/smsmgmt pages, pp. 1-27; Jun. 23, 1999. (Cited in U.S. Appl. No. 10/335,490).
www.mspassociation.org web pages, pp. 1-6; no later than Nov. 28, 2001. (Cited in U.S. Appl. No. 10/335,490).
Zhang, Guoqing et al. "An Information Protection System for Intranets." Proceedings of the Seventh International Symposium on Computers and Communications(2002).
Written Inquiry from Japanese Patent Application No. 2003/0560745 mailed on Jul. 14, 2010.
Office Action issued in Japanese Patent Application No. 2003-0560745 mailed Jan. 9, 2008.
Decision of Rejection in Japanese Paten Application Serial No. 2003-0560745 mailed on Jul. 23, 2008.
Office Action from Canadian Patent Application No. 2,473,444 mailed on Nov. 15, 2007.
Office Action in Chinese Patent Application No. 028285425 mailed on Dec. 8, 2006.
International Search Report for PCT/US04/04292 dated Jan. 14, 2005, 1 page.
Supplemental Search Report from European Application No. 04711110.9-1244 mailed on May 17, 2010.
Office Action Summary from Australian application No. 2002245262 which was mailed on Sep. 15, 2006.
The International Preliminary Examination Report from PCT/US02/01093 mailed Oct. 27, 2003.
The International Search Report from PCT/US02/01093 mailed Aug. 5, 2002.
Allen, Julia, "State of the Practice of Intrusion Detection Technologies," Networked Systems Survivability Program, Jan. 2000.
Dan Kuykendall, a/k/a Seek3r, "Legal Docs: The response to their complaint", <www.kuykendall.org>, printed Oct. 25, 2002, pp. 2-4.
Declaration of Dan Kuykendall in Opposition to OSC Re: Preliminary Injunction, Foundstone, Inc, v. NT OBJECTives, Inc., Case No. 02CC15350 (Sup. Ct. Cal.), dated Oct. 23, 2002, pp. 3-4.
Declaration of Eric Caso in Opposition to OSC Re: Preliminary Injunction, Foundstone, Inc, v. NT OBJECTives, Inc., Case No. 02CC15350 (Sup. Ct. Cal.), dated Oct. 23, 2002, pp. 2-5 & Exhibits B, C and D.
Declaration of Jassen D. Glaser in Opposition to OSC Re: Preliminary Injunction, Foundstone, Inc. v. NT OBJECTives, Inc., Case No. 02CC15350 (Sup. Ct. Cal.), dated Oct. 23, 2002, pp. 6-10 & Exhibits F, G.
Declaration of Micahel J. Morton in Opposition to OSC Re: Preliminary Injunction, Foundstone, Inc. v. NT OBJECTives, Inc., Case No. 02CC15350 (Sup. Ct. Cal.), dated Oct. 23, 2002, pp. 2-5.
Declaration of Stuart McClure in Support of Plaintiffs Application for Temporary Restraining Order and Preliminary Injunction, Foundstone, Inc. v. NT OBJECTives, Inc., Case No. 02CC15350 (Sup. Ct. Cal.), dated Oct. 4, 2002, pp. 2-5.
Memorandum of Points and Authorities in Support of Defendants' Opposition to Plaintiff's OSC Re: Preliminary Injunction, Foundstone, Inc. v. NT OBJECTives, Inc., Case No. 02CC15350 (Sup. Ct. Cal.), dated Oct. 23, 2002, pp. 9-10.
Plaintiff Foundstone's Supplemental Reply in Support of Order to Show Cause Re: Preliminary Injunction, Foundstone, Inc. v. NT OBJECTives, Inc., Case No. 02CC15350 (Sup. Ct. Cal.), dated Oct. 28, 2002, pp. 2-3.
Plaintiff's Memorandum of Points and Authorities in Support of Application for Temporary Restraining Order, Preliminary Injunction, Foundstone, Inc. v. NT OBJECTives, Inc., Case No. 02CC15350 (Sup. Ct. Cal.), dated Oct. 4, 2002, pp. 9-13.
Plaintiff's Reply in Support of Motion for Preliminary Injunction, Foundstone, Inc. v. NT OBJECTives, Inc., Case No. 02CC15350 (Sup. Ct. Cal.), dated Oct. 25, 2002, pp. 5-8.
Notice of Allowance in U.S. Appl. No. 12/476,082 mailed on Aug. 8, 2011.
Request for Continued Examination in U.S. Appl. No. 11/748,439 filed on Sep. 22, 2011.
Notice of Allowance in U.S. Appl. No. 10/778,779 mailed on Jul. 19, 2011.

Request for Continued Examination in U.S. Appl. No. 10/778,779 filed on Aug. 16, 2011.
Notice of Allowance in U.S. Appl. No. 10/778,779 mailed on Sep. 6, 2011.
Notice of Allowance in U.S. Appl. No. 12/476,082 mailed on Jan. 23, 2012.
Request for Continued Examination in U.S. Appl. No. 12/476,082 filed on Nov. 7, 2011.
Notice of Allowance in U.S. Appl. No. 11/748,439 mailed on Oct. 28, 2011.
U.S. Patent Application and Preliminary Amendment filed as U.S. Appl. No. 13/312,963 on Dec. 6, 2011.
U.S. Patent Application and Preliminary Amendment filed as U.S. Appl. No. 13/312,978 on Dec. 6, 2011.

* cited by examiner

SYSTEM AND METHOD OF MANAGING NETWORK SECURITY RISKS

BACKGROUND OF THE INVENTION

1. Field of the Invention

Embodiments of the invention relate to managing threats to network security.

2. Description of the Related Art

Computer networks are exposed to a large number of vulnerabilities to network security, including open ports, flawed application programs, worms, viruses, trojan horses, and the like. At times, individuals, groups of individuals, or automated programs, either intentionally or unwittingly, take advantage of these vulnerabilities to compromise network security. Attempts to compromise network security include attempts to damage data, to infect one or more computers with viruses or worms, and to access a computer system without authorization.

Automated vulnerability scanners scan the assets and nodes of a network to discover active devices (thereby building an asset inventory) and to detect the vulnerabilities that exist on a network. Based on the information provided by vulnerability scanners, administrators can remediate vulnerabilities so that they are less likely to be exploited in such a way as to compromise network security. Vulnerability scanners are most effective when used by administrators that understand which vulnerabilities pose a significant threat to network security so that they can prioritize their time and resources to remediation of the most severe vulnerabilities. Many administrators, however, have neither the time nor the experience to maintain up-to-date knowledge of network security threats.

SUMMARY OF THE INVENTION

Embodiments of the invention provide up-to-date information regarding network security threats. According to an embodiment, a threat correlation module receives threat intelligence alerts that include such up-to-date security threat information. The threat intelligence alerts include data about attributes of assets that are known to be susceptible to a certain threat. For example, an exemplary threat intelligence alert may inform the threat correlation module that a worm is currently spreading on the internet and that computers running the Mac OS operating system and that have an email server running on them are susceptible to the threat. The threat correlation module is also in communication with a vulnerability scanner that provides up-to-date information about attributes of the assets on a computer network. The threat correlation module compares the attributes of assets that are known to be susceptible to a threat with the attributes of actual assets on the network. If the threat correlation module finds actual assets that have the attributes susceptible to a threat, the threat correlation module displays a list of those susceptible assets, the list being sorted with those susceptible assets that pose the greatest risk to overall network security near the top of the list. Furthermore, the threat correlation module provides information and tools that are useful to allow an administrator to remediate any security flaws before the threats become realized and a vulnerability is exploited by an attacker.

According to an embodiment, a security risk management system comprises a vulnerability database, an asset database, a local threat intelligence database and a threat correlation module. The vulnerability database comprises data indicative of security vulnerabilities possessed by each asset of a plurality of assets connected to a computer network. The asset database comprises data indicative of attributes possessed by each asset of the plurality of assets. Thus, the vulnerability database and the asset database together define for each asset a group of security vulnerabilities and attributes possessed by each asset. The threat correlation module is in communication with the vulnerability database and the asset database. The threat correlation module is configured to receive at least one threat intelligence alert that comprises data identifying at least one security threat that affects a class of assets. A threat intelligence alert defines the affected class of assets with reference to an associated group of attributes and security vulnerabilities that are possessed by the affected class of assets. The threat correlation module is also configured to identify a selected threat from the at least one security threat identified by the at least one threat intelligence alert and to identify any assets affected by the selected threat. An asset is deemed to be affected by the selected threat if the group of attributes and security vulnerabilities associated with the selected threat matches the group of attributes and security vulnerabilities possessed by the asset.

In one embodiment, the threat correlation module is also configured to display information about each affected asset including a risk score that is representative of a level of risk to which the asset exposes the network. The risk score may be based at least on a criticality of the asset, a vulnerability severity ranking for each vulnerability associated with the asset, and a criticality of the threats that affect the asset.

In one embodiment, the security risk management system also comprises at least one security risk management tool in communication with the threat correlation module and configured to act upon data displayed by the threat correlation module. The security risk management tool may be a threat response module configured to provide a user with recommended ways to respond to a threat. The threat response module may also be configured to access a vulnerability remediation module and initiate an automated ticketing and workflow process that at least partially directs remediation of asset vulnerabilities. The threat response module may also be configured to transmit to a user, in response to receiving a download request, a file that includes information related to the affected assets.

In one embodiment, the security risk management tool can be a compliance tracking module configured to receive user input specifying compliance goals in terms of assets that are not actually affected by a threat but that are potentially affected by the threat, to periodically determine compliance with the goal, and to display a time-based compliance measurement indicative of actual compliance with the goal in relation to the goal. The compliance goal and the compliance measurement can be expressed as a percentage of assets not affected by a threat or can both be expressed as a raw number of assets not affected by a threat.

In one embodiment, the security risk management tool can be a threat update module comprising a threat update control associated with each affected asset, configured such that when a user activates the threat update control associated with a particular asset, the threat update module initiates a process in which a vulnerability scanner scans the particular asset to update its vulnerabilities and attributes.

According to an embodiment, a threat correlation module is in communication with a vulnerability database and an asset database. The threat correlation module is configured to correlate data concerning a network security threat with data concerning a plurality of assets on a computer network to identify any assets of the plurality of assets that are affected by the network security threat. The data concerning the network security threat is received by the threat correlation module as part of a threat intelligence alert. The data concerning a plurality of assets is derived from the vulnerability database and the asset database.

In one embodiment, the threat correlation module periodically receives threat intelligence alerts. The threat correlation module may receive threat intelligence alerts in response to a request for a threat intelligence alert from the threat correlation module to a threat intelligence communication module. The threat correlation module may request threat intelligence alerts according to a schedule that is set by a user of the threat correlation module. Alternatively, the threat correlation module receives the threat intelligence alerts from a threat intelligence communication module according to a schedule maintained by the threat intelligence communication module.

According to an embodiment, the disclosed threat correlation module performs a method of correlating a network security threat with assets affected by the network security threat. The method comprises: (1) identifying a selected threat, (2) identifying a group of assets for comparison, (3) comparing attributes and vulnerabilities associated with each asset of the group of assets with attributes and vulnerabilities of the selected threat, and (4) displaying a list of affected assets comprising each asset whose attributes and vulnerabilities match the attributes and vulnerabilities of the selected threat. The match of attributes and vulnerabilities may be an exact match or a partial match. Identifying a group of assets for comparison may include identifying a group of assets that, based on the vulnerabilities and attributes of the assets and the vulnerabilities and attributes of the selected threat can potentially be affected by the selected threat. Displaying a list of affected assets may include displaying along with each affected asset a risk score representing a level of security risk posed by the affected asset to a computer network, wherein the list is sorted such that assets posing high security risk are presented near the top of the list.

These and other embodiments advantageously update a system administrator with up-to-date, pertinent, and accurate threat intelligence alerts that assist him or her to prevent network security threats from turning into exploits that harm the computer network. A number of preferred embodiments will now be described in more detail with reference to the drawings.

DETAILED DESCRIPTION OF PREFERRED EMBODIMENTS

Figure 1:
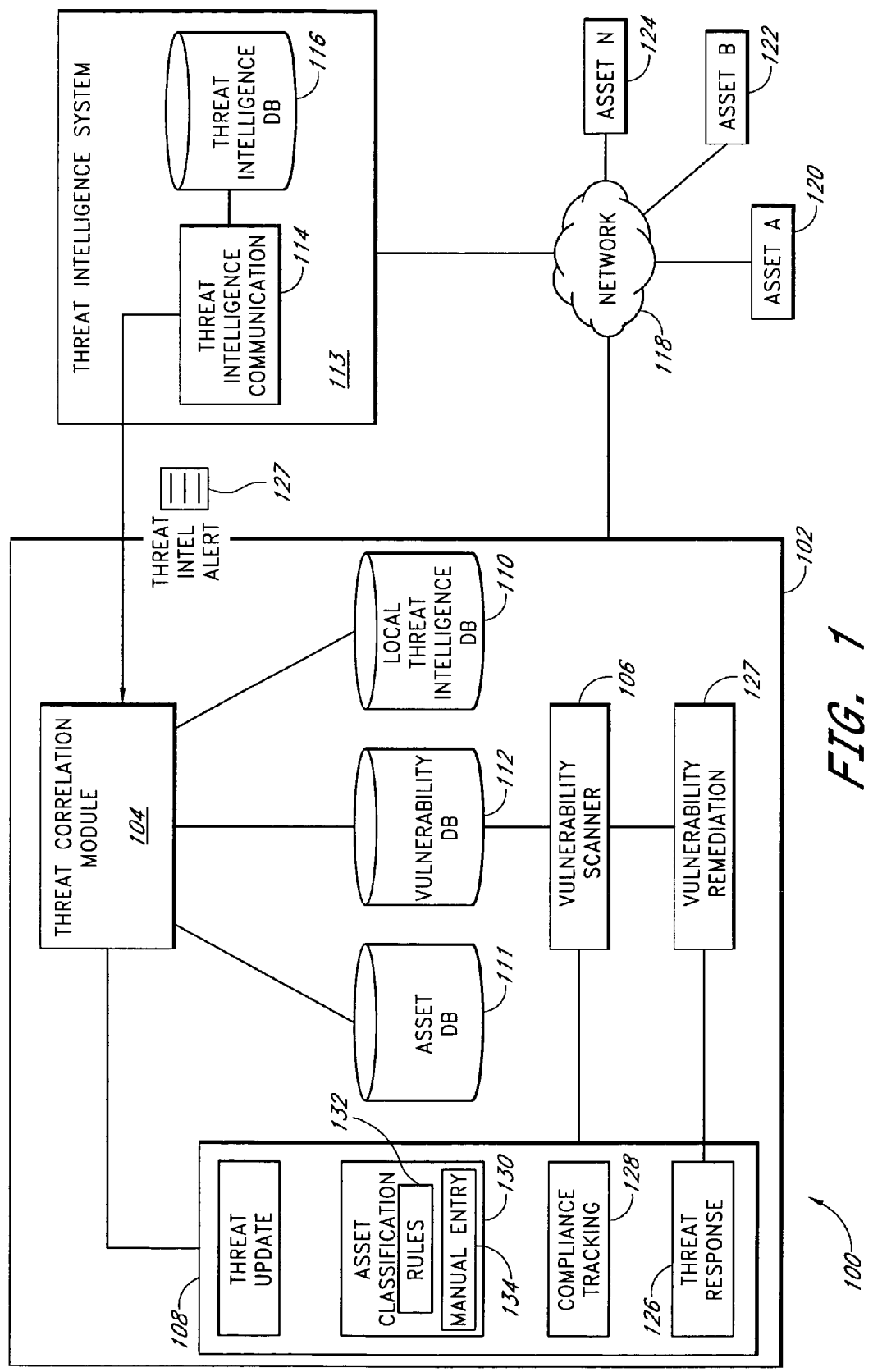
FIG. 1 is a block diagram of a computer network environment in which one embodiment of a security risk management system resides.

Computer networks are exposed to a number of vulnerabilities to network security. Such vulnerabilities include open ports, flawed email application programs and other flawed application programs that can provide unauthorized access to a network node, trojan horses, worms, viruses, and the like. Many of these vulnerabilities, such as trojan horses, worms, and viruses, can cause damage or data loss to a computer system simply by existing and being activated on a computer system. Other vulnerabilities, such as holes created by flawed email or other flawed application programs, can provide means for individuals to gain unauthorized access to a computer system. Individuals that gain unauthorized access to a computer system may willfully or unwittingly view secret information, delete files, alter the settings of a computer network, or otherwise compromise the security of a computer network. For this reason, many administrators desire to detect network vulnerabilities and fix them before they are exploited to the detriment of the security of the computer network. Throughout this application, the term "vulnerability" is a broad term that encompasses its ordinary meaning within a computer network security context and includes, without limitation, an open port that can be exploited for unauthorized network access, a security hole in an application program that can be exploited for unauthorized network access, a backdoor, a trojan horse, a worm, a virus, and any other security flaw that can be exploited to allow unauthorized access to a computer network.

Periodically, certain security events become particularly threatening to network security, either with regard to the network as a whole or with regard to a particular asset or group of assets on a computer network. (Throughout this application, the term "asset" encompasses all devices or nodes that may be connected to a computer network, such as, for example, computers, printers, and routers, and all applications and services that are run on the devices and nodes, such as, for example, an email client program, a mail server, a database server, and the like.) For example, news reports sometimes indicate that a security breach has been found in a particular application, or that a particular worm is sweeping the internet, or the like. Throughout this application, the term "threat" is a broad term that encompasses its ordinary meaning within the context of computer network security and refers without limitation to the probability that a vulnerability will be exploited to compromise the security of a computer network. As will be understood by a skilled artisan, there is a threat associated with every vulnerability, because every vulnerability, by definition, can potentially be exploited. However, threats vary widely in degree, as some exploits are more likely to occur than others and some exploits will cause greater damage if they occur. Additionally, a threat may become particularly dangerous when individuals, groups, or automated programs systematically attempt to exploit a vulnerability. Throughout this application, the potential harm related to a particular threat, in terms of the likelihood that an actual exploit will occur and the degree of damage that will be caused by an exploit if it does occur, is referred to as the criticality of the threat. Threat criticality cannot always be measured with mathematical precision, however, and threat criticality encompasses wholly or partially subjective evaluations of the criticality of a particular threat.

Computer administrators are responsible for protecting their computer networks from security threats and for ensuring that vulnerabilities on the network will not be exploited. This responsibility can be daunting because a large number of vulnerabilities may exist in the assets of a computer network, security threats are always changing, and computer administrators have limited time and other resources. At times, therefore, computer administrators cannot ensure that every vulnerability will be eliminated immediately, and must instead focus on those vulnerabilities that pose the greatest risk to network security. This limited task presents its own problems, because it requires computer administrators to have updated knowledge of the most significant threats to computer network security and knowledge or tools for fixing any vulnerabilities to prevent such threats from turning into actual exploits.

Advantageous embodiments of the security risk management system described herein enable a computer administrator to effectively and efficiently focus on fixing the vulnerabilities on his or her computer network that pose the greatest threat to the security of the computer network. Embodiments of the system receive automated updates of threat intelligence, present pertinent information to the administrator for responding to the threats, correlate threats known to the system with actual vulnerabilities that have been detected on the computer network, provide tools for manually, semi-automatically, or automatically fixing the vulnerabilities, and provide reporting capabilities for tracking the security of particular assets and groups of assets on the computer network or the security of the network as a whole.

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears. Additionally, embodiments of the present invention operate at least in part by communicating with certain components that have been disclosed in one or more patent applications and publications, including U.S. patent application Ser. No. 10/050,675 entitled "SYSTEM AND METHOD FOR NETWORK VULNERABILITY DETECTION AND REPORTING," which was filed on Jan. 15, 2002, and which was published as United States Publication No. US 2003-0195861 on Oct. 16, 2003, International Publication No. PCT WO 03/060717 A1 entitled "SYSTEM AND METHOD FOR NETWORK VULNERABILITY DETECTION AND REPORTING," which was published on Jul. 24, 2003, U.S. patent application Ser. No. 10/387,221 entitled "SYSTEM AND METHOD FOR NETWORK VULNERABILITY DETECTION AND REPORTING," which was filed on Mar. 10, 2003, U.S. patent application Ser. No. 10/387,358 entitled "SYSTEM AND METHOD FOR NETWORK VULNERABILITY DETECTION AND REPORTING," which was filed on Mar. 10, 2003 and which was published as United States Publication No. US-2003-0217039-A1 on Nov. 20, 2003, and U.S. patent application Ser. No. 10/387,223 entitled "SYSTEM AND METHOD FOR NETWORK VULNERABILITY DETECTION AND REPORTING," which was filed on Mar. 10, 2003. The foregoing patent applications and publications are hereby incorporated by reference herein in their entirety. Embodiments of the components described in the incorporated applications and publications are herein briefly described for ease of understanding of embodiments of the present invention. In addition to the embodiments of these components that are briefly described herein, embodiments of the present invention can interoperate with the embodiments of these components as described in the applications and publications that have been incorporated by reference.

FIG. 1 is a block diagram of a computer network environment 100 in which one embodiment of a security risk management system 102 resides. In one embodiment, the security risk management system 102 generally comprises a plurality of modules and a plurality of databases. In one embodiment, each module is implemented in software such that it comprises a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer to perform one or more specified tasks. The computer-executable instructions can be stored contiguously or non-contiguously and can be stored and executed on a single computer or distributed across multiple computers. Additionally, multiple modules can be combined into a single larger module that performs multiple functions. A skilled artisan will appreciate, in light of this disclosure, how each of the modules can be implemented, in addition to or in place of software, using hardware or firmware. As such, as used herein, each module can be implemented in software, hardware, firmware, or any combination of the foregoing. As with software modules, a skilled artisan will appreciate in light of this disclosure how hardware, firmware, or combination modules can be combined into a fewer number of modules or divided into a larger number of modules and distributed.

As used herein, the term "database" is a broad term that encompasses its ordinary meaning and includes, without limitation, any grouping of data stored in a computer-readable format, whether the data is stored on a disk drive, in Random Access Memory ("RAM"), as Read Only Memory ("ROM"), or the like.

In one embodiment, the security risk management system 102 comprises a threat correlation module 104, a vulnerability scanner 106, a plurality of security risk management tools 108, a local threat intelligence database 110, an asset database 111, and a vulnerability database 112. In one embodiment, the security risk management system 102 is connected to a threat intelligence system 113 through a communications network 118. Additionally, in one embodiment, the security risk management system 102 is connected to a plurality of assets, such as an asset A 120, an asset B 122, and an asset N 124 through the communications network 118. Alternatively, the assets 120, 122, and 124 and the threat intelligence system 113 can be connected directly to the security risk management system 102, such as by using a cable, a wireless connection, or the like, or some of the foregoing can be connected directly to the security risk management system 102 while others of the foregoing are connected to the security risk management system 102 through the communications network 118. Additionally, one or more of the components 104, 106, 108, 110, 111, and 112 of the security risk management system 102 can be distributed such that they are connected to each other not directly, as shown, but via one or more communications networks.

In one embodiment, the threat intelligence system 113 comprises a threat intelligence communication module 114 and a threat intelligence database 116. In one embodiment, the threat intelligence communication module 114 is a module as defined with regard to the modules of the security risk management system 102. Similarly, in one embodiment, the threat intelligence database 116 is a database as defined with regard to the databases of the security risk management system 102. In one embodiment, the threat intelligence database 116 stores information concerning current threats to network security. Preferably, the threat intelligence database 116 contains a description of the threat, a criticality ranking of the threat, one or more vendor identifiers that specify established industry names for the threat event (such as, for example, the labels defined by the Common Vulnerability & Exposures ("CVE") dictionary, which is compiled by the CVE editorial board and, maintained by the MITRE Corporation), the vulnerability or group of vulnerabilities that are exploited by the threat, types of assets that are subject to the threat, including, for example, operating systems that are subject to the threat, types of services that are subject to the threat, ports that are subject to the threat, external hypertext links that point to additional information concerning the threat, available exploits used by or involved with the threat, analysis of the threat impact versus target environments, and other information about the threat that is deemed relevant. In one embodiment, the criticality ranking of a threat indicates the overall severity of the threat, and combines factors such as whether individuals, groups, or automated processes are actively purveying the threat (such as when an individual is intentionally trying to infect the Internet with a worm), the level of damage that the threat will cause to affected assets, an estimate of the number of assets that have already been affected by the threat, and other factors deemed relevant to measuring the severity of a threat. The foregoing factors can comprise objective or subjective data or any combination of subjective and objective data. In one embodiment, the highest possible criticality rankings are assigned when a threat is pervasive, active attempts are being made to exploit a vulnerability, and a successful exploit will severely damage any asset that it affects. In one embodiment, the threat criticality is a numeric score expressed in a range, such as a score from 0 to 100, with 100 being the highest criticality ranking. In another embodiment, the threat criticality is an alphabetic score, such as A for extreme criticality, B for high criticality, C for average criticality, and the like. A skilled artisan will appreciate, in light of this disclosure, that a large number of ranking systems are understood in the art and that any of them may be used to express the threat criticality.

In one embodiment, data can be entered into the threat intelligence database 116 by a human user, by an automated process, or by a combination of a human user and an automated process. Preferably, the threat intelligence database 116 contains comprehensive information representing a large percentage of threats to network security, covering a large percentage of assets that may be part of a computer network, and is updated quickly based on information provided by experts in network security. Advantageously, a comprehensive, up-to-date, and accurate threat intelligence database 116 can provide information upon which an administrator may rely in order to establish and maintain a high level of network security. Additionally, in an advantageous embodiment, a threat intelligence database 116 provides prospective information about conceptual threats that allow an administrator to proactively act before conceptual threats become realized threats. As used herein, a conceptual threat is a generalized explanation of a threat that is known to exist, and that might affect the assets of an administrator's computer network, but there is no requirement that any data exist that the network has actually been affected by the conceptual threat. An example of a conceptual threat is a particular worm that has been launched on the Internet. The worm may have affected many nodes on the Internet, it may have been widely reported in news reports, and it may be known to affect users of a particular email program. The worm may also have characteristics that can be used to determine whether the worm threat has already been realized on a computer network, including indications that a network is under attack by the worm. For example, a network under attack by the worm might have an increased number of messages sent to mail servers, might have increased mail traffic on a computer network, or the like.

As will be apparent to a skilled artisan in light of the foregoing paragraph, a conceptual threat can be defined, and a warning regarding the conceptual threat can be distributed, prior to receiving any indication that a realized threat exists on a particular computer network. In one advantageous embodiment, the threat intelligence database 116 contains information about conceptual threats, and the threat intelligence communication module 114 communicates threat intelligence alerts 127 based on information about conceptual threats. Advantageously, the foregoing focus on conceptual threats allows the security risk management system 102 to receive information about threats before any evidence exists that any threat has been realized. Advantageously, this allows administrators that use the security risk management system 102 to respond to threats before they are realized, and to take preventive measures to ensure that the threats will not become realized on their respective systems.

In one embodiment, the threat intelligence communication module 114 transmits threat intelligence alerts 117 to the threat correlation module 104. Each threat intelligence alert 117 comprises data about one or more threats that is stored in the threat intelligence database 116. In one embodiment, the data within each threat intelligence alert 117 has, for each threat for which information is transmitted, all of the data about the threat that is maintained in the threat intelligence database 116. In another embodiment, the data within each threat intelligence alert 117 has a subset of data maintained for each of the threats that is being transmitted. In one embodiment, the threat intelligence communication module 114 transmits threat intelligence alerts 117 to the threat correlation module 104 in response to a request, from the threat correlation module 104, for a threat update. The threat correlation module 104 can, in one embodiment, be configured to periodically send such requests, or can send such requests in response to a user action, such as a user clicking a button in a graphical user interface, or according to a schedule entered by a user and maintained by the threat correlation module 104. In one embodiment, the threat intelligence communication module 114 assembles one or more threat intelligence alerts 117 for transmission to the threat correlation module 104 that contain information about threats that has been added to the threat intelligence database 116 since the last time that the threat correlation module 104 requested a threat update.

In an advantageous embodiment, the threat intelligence communication module 114 is configured to recognize different users of the threat correlation module 104 and transmit individualized threat intelligence alerts 117. Standard identification and authentication techniques, as will be understood by a skilled artisan, can be used for this purpose. Advantageously, this allows a service provider, using the threat intelligence system 113, to provide threat updates to a number of customers, where each customer uses a copy of the threat correlation module 104. Additionally or alternatively, the threat correlation module 104 can be a centralized module that is accessible to multiple users via network. In an embodiment, the threat intelligence database 116 maintains information concerning the date and time each record was entered into the threat intelligence database 116, and a record of the date and time that the threat intelligence communication module 114 transmitted a threat intelligence alert 117 to a particular user of the threat correlation module 104. In an advantageous embodiment, separate timestamp information is maintained for each user of the threat correlation module 104, and the threat intelligence communication module 114 is configured to identify the particular user of the threat correlation module 104 that has requested updated threat information.

Alternatively, or additionally, the threat intelligence communication module 114 can be configured to initiate the transmission of threat intelligence alerts 117, under all or certain conditions. In one embodiment, the threat intelligence communication module 114 transmits threat intelligence alerts 117 periodically, according to a schedule maintained by the threat intelligence system 113. In one embodiment, this periodic update is individualized for each user of the threat intelligence communication module 114. In one embodiment, the threat intelligence system 113 allows each user to specify a periodic update schedule. In one embodiment, the threat intelligence communication module 114 performs batch periodic updates, updating one or more groups of users of the threat correlation module 104 according to a schedule that is approximately the same for each user belonging to a particular group. A skilled artisan will appreciate, in light of this disclosure, that there exist a number of ways in which periodic updates can be performed, all of which are encompassed by this disclosure.

In one embodiment, the threat intelligence communication module 114 initiates a threat intelligence alert 117 immediately, or within a short time, after an urgent threat has been added to the threat intelligence database 116. As used in the foregoing sentence, an "urgent threat" is a threat that has a criticality ranking that is deemed to be sufficiently critical that administrators should be quickly informed of the threat such that they can take immediate steps to fix any vulnerabilities associated with the threat. In one embodiment, the threat intelligence system 113 has an assigned threat criticality threshold that defines, for all users, the criticality level that constitutes an "urgent threat." For example, in an embodiment in which the criticality ranking is a numerical ranking from 0 to 100, with 100 being the highest criticality, a threat with a criticality of 80 or higher might be deemed to be an "urgent threat," such that a newly added threat with an 80 criticality ranking would immediately be transmitted, by the threat intelligence communication module 114, to the threat correlation module 104. In another embodiment, the threat intelligence system 113 allows each individual user to set the criticality level that will be deemed an "urgent threat" to that individual user. In another embodiment, the threat intelligence system 113 has a default threat criticality threshold that initially defines the criticality level that constitutes an "urgent threat" for all users, but allows each individual user to set a different threshold. Advantageously, the foregoing embodiments can provide as much advance warning of network security threats as is possible to an administrator that is a user of the threat correlation module 104, allowing the administrator to take quick remedial action and potentially prevent a threat from becoming an actual exploit of a vulnerability.

In one embodiment, when the threat correlation module 104 receives the threat intelligence alert 117 from the threat intelligence communication module 114, the threat correlation module 104 stores the information contained in the threat intelligence alert 117 into the local threat intelligence database 110. In one embodiment, the threat correlation module 104 refers to the information stored in the local threat intelligence database 110 in order to compile lists of threats to display to users, to allow users to select a threat for more detailed information, and for correlation of the threat data with data about actual vulnerabilities found on the computer network that is stored in the vulnerability database 112. In one embodiment, the threat correlation module 104 also refers to data stored in the asset database 111 in correlating the threat data with vulnerability data from the vulnerability database 112. More detailed descriptions of the creation, maintenance, and structure of the vulnerability database 112 and the asset database 111 now follow.

In one embodiment, the vulnerability scanner 106 is a module that scans all of the assets 120, 122, and 124 located on the communications network 118, builds the assets' technical profiles (e.g. operating system, network services, network interface cards, and the like, of each asset) and detects any vulnerabilities in any of the assets 120, 122, and 124. Based on the results of the scan, the vulnerability scanner 106 populates the vulnerability database 112 with data representing the vulnerabilities that were found in the assets 120, 122, and 124. The data stored in the vulnerability database 112 includes, with respect to each asset that has a detected vulnerability, an identification of the asset, an identification of the vulnerability, any open ports on the asset, the operating system that is running on the asset, the IP address where the asset is located, a domain name for the asset, a NetBIOS name, a Windows Domain/Workgroup name, if applicable, and any other information that is pertinent to the vulnerability of the particular asset.

Preferably, embodiments of the vulnerability scanner 106 have the components and functions of the embodiments of a vulnerability scanner that are disclosed in one or more of the above-identified applications or publications that have been incorporated by reference.

In one embodiment, the asset database 111 is created and maintained by the asset classification module 130, one of several of the security risk management tools 108. In one embodiment, the asset database 111 contains data about each of the assets 120, 122, and 124 that are on the communications network 118. In one embodiment, such data includes, for example, an IP address, open ports on the asset, banners produced by the asset, the operating system run by the asset, the criticality of the asset, services run on the asset, an asset group to which the asset belongs, a human understandable asset label, an asset owner, and a geographical asset location. In one embodiment, the asset criticality is a ranking of the importance of the asset to the organization that owns the asset. Assets with high criticality are those, for example, that an organization cannot afford to lose. Examples of assets that are typically highly critical to most organizations are file servers, web servers that publish the organization's web page to the public, inventory databases, point of sale information and devices, and the like. Typically less critical assets include test machines, staff desktop computers, and the like. A skilled artisan will appreciate, in light of this disclosure, that the asset criticality rank can be highly subjective. As such, in one embodiment the asset criticality rank can be assigned by a user, such as, for example an administrator. In another embodiment, objective factors, such as, for example, the amount of network traffic that goes through the asset, the amount of data stored on the asset, and the like, can contribute to the criticality of the asset, or the criticality of the asset can be calculated based completely on objective factors by the asset classification module 130.

In one embodiment, the asset classification module 130 manages the content of the asset database 111. For example, in one embodiment, the asset classification module 130 enrolls assets, meaning that it assigns asset attributes to each asset and stores the attributes in the asset database 111. Advantageously, in one embodiment, the asset classification module 130 allows for the classification of both identified devices and potential devices that are not yet known to the system. In one embodiment, the asset classification module 130 has both an automatic classification tool 132 and a manual classification tool 134. In one embodiment, the automatic classification tool 132 collects a portion of the data that it stores in the asset database 111, such as, for example, IP addresses, operating system, ports, network services, and banners, from data generated by the vulnerability scanner 106, as is described in detail in one or more of the above-identified applications or publications that have been incorporated by reference. In one embodiment, the automatic classification tool 132 executes a number of asset classification rules that automatically classify at least a portion of the assets based on the foregoing information. An example of an asset classification rule is IF Operating System IS Windows AND Banner INCLUDES "Exchange" THEN LABEL IS "Microsoft Exchange Server" AND GROUP IS "Mail Servers" AND VALUE IS "4." In one embodiment, this and similar rules can be pre-defined in the asset classification module 130, or can be defined by a user, using text-based or graphics-based entry tools as are understood in the art. In one embodiment, the foregoing and similar asset classification rules can be used to generate asset attributed values for a number of assets, including, for example, label, group, asset value, owner, location, and the like.

In one embodiment, the manual classification tool 134 comprises text-based or graphics-based entry tools that allow a user to manually enter asset classification information into the asset database 111. Advantageously, the manual classification tool 134 allows a user to enter data from scratch so as to input a new asset that has not been detected, or to modify pre-existing data, so as to correct any incorrect asset attribute assignments made by the automatic classification tool 132 according to the asset classification rules.

Advantageously, according to the foregoing embodiments, the execution of the automatic classification tool 132 and the manual classification tool 134 produces a database 111 with data that supports the operation of the threat correlation module 104. Though a preferred embodiment includes both the automatic classification tool 132 and the manual classification tool 134, neither tool is necessary and the asset database 111 can be generated wholly by the automatic classification tool 132 or by the manual classification tool 134, without assistance from the other classification tool.

The operation of the threat correlation module 104, according to one embodiment, will now be described. As indicated, in one embodiment, the threat correlation module 104 receives threat intelligence alerts 117 from the threat intelligence communication module 114 and enters the information from the threat intelligence alert 117 into the local threat intelligence database 110, providing a local reference source for information regarding the threats. In one embodiment, the local threat intelligence database 110 is a collection of data from the threat intelligence alert 117 that is stored in RAM accessible by the threat correlation module 104. In one embodiment, the purpose of maintaining a local collection of the threat data is to allow the threat correlation module 104, and the associated security risk management tools 108, to manipulate the threat data locally, without having to constantly retrieve the threat data from the threat intelligence system 113. As such, there is no requirement for the local threat intelligence database 110 to store the data in permanent form, such as in a hard disk drive or the like, though embodiments of the security risk management system 102 can provide permanent storage.

Figure 2:
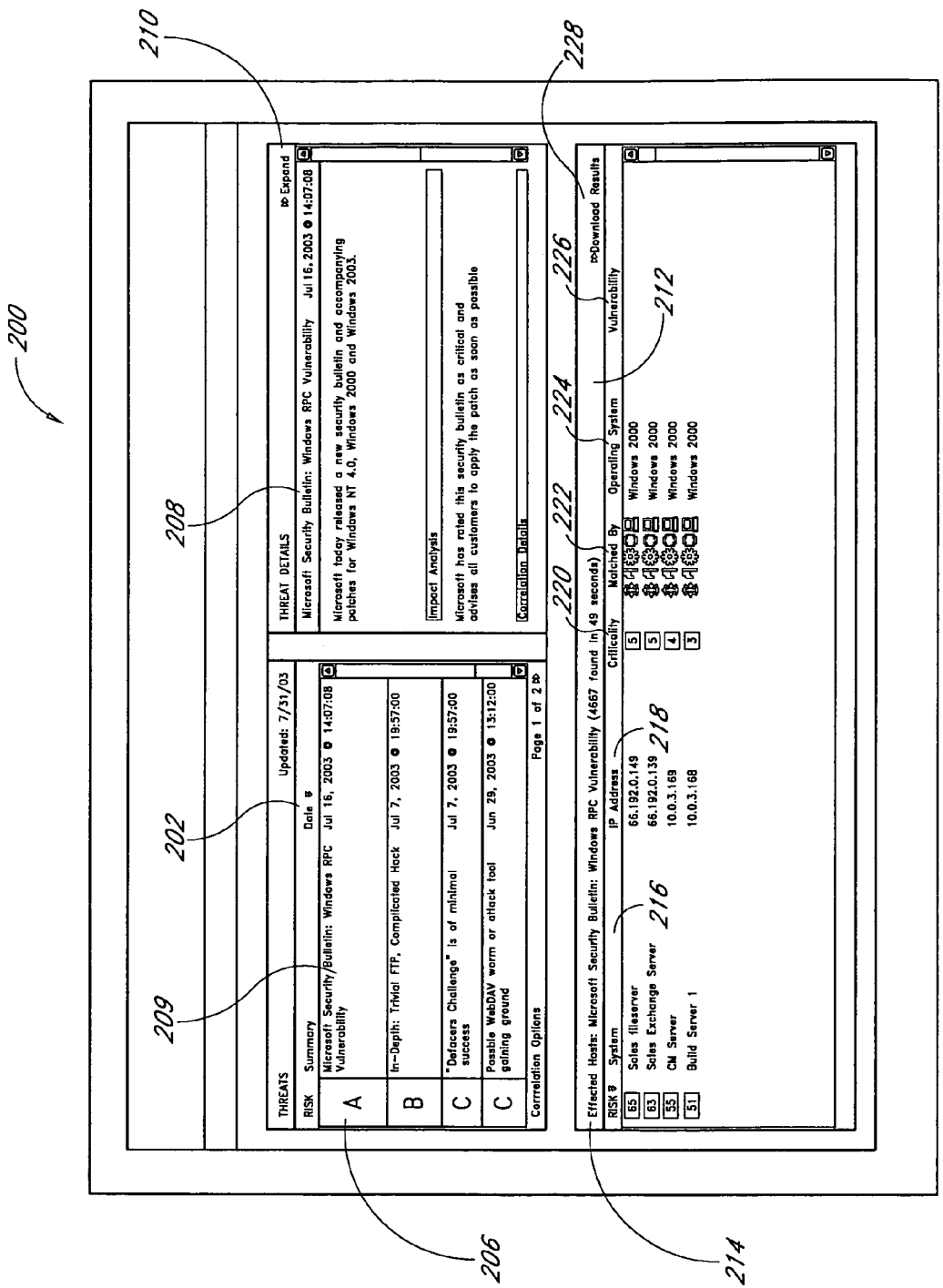
FIG. 2 is a simplified screen shot illustrating a display screen produced by one embodiment of the security risk management system of FIG. 1.

In one embodiment, the threat correlation module 104 retrieves information from the local threat intelligence database 110 and generates and displays a threat listing 202, as illustrated by FIG. 2. FIG. 2 depicts a simplified screen shot of a graphical user interface display 200 of a portion of the output of the threat correlation module 104 according to one embodiment. As illustrated by the simplified screen shot of FIG. 2, the threat listing 202, in one embodiment, comprises a threat summary 204 and a threat risk level 206, such that a user can quickly scan the threats to determine which threats might most significantly affect the user's network. In one embodiment, the threat correlation module 104 calculates the threat risk level 206 based on general characteristics of the threat, such as, for example, the threat criticality. Risk scoring is discussed herein in more detail in a later section of this disclosure.

As also illustrated in the simplified screen shot of FIG. 2, in one embodiment the threat correlation module 104 allows a user to highlight, on the threat list 202, a particular threat. Among other features made accessible by highlighting a specific threat, the threat correlation module 104, in one embodiment, displays detailed information about the selected threat in a threat detail display 208. In one embodiment, the threat detail display 208 includes an expand control 210. In one embodiment, if a user activates the expand control 210, the threat correlation module 104 displays still more details about the threat in an expanded display area (not shown). A skilled artisan will appreciate, in light of this disclosure, that a number of graphical and non-graphical interface tools exist for displaying information such as the foregoing on a display, and for allowing user input and control. A skilled artisan will appreciate, in light of this disclosure, how to implement a user interface and display that is suitable for particular situations. This disclosure encompasses all such implementations known to a skilled artisan.

In one embodiment, the threat correlation module 104 also allows the user to select a particular threat and request that it be correlated with the assets 120, 122, and 124 of the communications network 118 to determine which assets are actually affected by the selected threat. In one embodiment, the threat correlation module 104 identifies a group of assets upon which the correlation will occur. In one embodiment, the threat correlation module 104 automatically identifies the group of assets by the assets 120, 122, 124 on the communications network 118 that can potentially be affected by the chosen threat. As will be appreciated by a skilled artisan in light of this disclosure, certain threats can affect only assets that have certain characteristics. For example, certain threats might target particular vulnerabilities that exist only in Windows operating systems, while other threats might target particular vulnerabilities that exist only in computers running the Mac OS. Thus, according to one embodiment, the threat correlation module 104 compares the data about the chosen threat within the local threat intelligence database 110, which indicates, among other things, the characteristics of assets that the threat affects, with data about the assets on the system located in the asset database 111. In one embodiment, the threat correlation module 104 performs correlation calculations only on those assets described in the asset database 111 that have characteristics that match the characteristics of potentially affected assets, as described in the local threat intelligence database 110. For example, according to the foregoing embodiment, if a particular worm is the chosen threat, and if, according to the local threat intelligence database 110, the worm affects Windows 95 machines with port 80 open, the threat correlation module 104 will ignore Unix machines and Mac OS machines and will show a corresponding weaker correlation with Windows 95 machines without port 80 open.

Alternatively or additionally, the threat correlation module 104 can be configured to allow a user to manually identify which asset groups will be checked. In one embodiment, the threat correlation module 104 checks the assets that are specifically chosen by the user without regard to whether the assets are potential targets of the threat, as defined by the local threat intelligence database 110. In another embodiment, the threat correlation module 104 checks assets that fall within general classifications of assets identified by a user and that also are determined, with reference to the local threat intelligence database 110, to be potential targets of the selected threat. Alternatively or additionally, the threat correlation module 104 can be configured, in one embodiment, to check all assets without regard to whether the assets are potential targets of the threat, as defined by the local threat intelligence database 110. As such, while in a preferred embodiment, the threat correlation module 104 attempts to correlate only threats that potentially affect assets on the system, this feature is not required, and some embodiments may not have this feature.

In one embodiment, the threat correlation module 104 checks the data about each of the identified assets in the vulnerability database 112 to determine if the asset actually is vulnerable to the selected threat. In one embodiment, each threat intelligence event stored in the local threat intelligence database 110 has associated with it a number of correlation rules for matching attributes of the threat intelligence events with asset attributes stored in the asset database 111 and the vulnerability database 112. Among the attributes that can be matched, according to one embodiment, are operating system, port, service, banner, and vulnerability. In one embodiment, the threat correlation module 104 can make either partial or complete matches, and can determine, using standard statistical techniques, a level of confidence or completeness for partial matches. Based on the correlation of asset attributes and threat attributes, the threat correlation module 104 determines which, if any, of the assets on a network are susceptible to the selected threat. In one embodiment, the threat correlation module 104 adds each asset that is susceptible to the chosen threat to an affected asset list 212.

The foregoing operations, in accordance with one embodiment, constitute the correlation of threats to detected vulnerabilities. As illustrated in FIG. 2, in one embodiment the threat correlation module 104 displays the affected asset list 212, which lists all of the assets that are susceptible to the selected threat. In one embodiment, additional information about the asset is also displayed, including, for example, an asset risk score 214, an asset label 216, an asset IP address 218, an asset criticality 220, a "matched by" indicator 222, an asset operating system 224, asset vulnerabilities 226, and the like.

In one embodiment, the "matched by" indicator 222 indicates, for each of several attributes, whether a match has occurred. In one embodiment, the potentially matching attributes shown by the "matched by" indicator 222 are operating system, network service, port, vulnerability, and network service banner. In one embodiment, the correlation between an asset and a threat becomes stronger as more of the "matched by" attributes are matched. Similarly, as the correlation becomes stronger, the likelihood that the asset will be affected by the threat rises. In one embodiment, the "matched by" indicator 222 displays a number of icons to show whether each attribute, including operating system, network service, port, vulnerability, and network service banner, have been matched. A skilled artisan will appreciate, in light of this disclosure, that the use of icons is not mandatory; letters, numbers, or any other symbol can be used.

Additionally, in one embodiment, the "matched by" information is used as a secondary sort index, after the risk score, to determine the order in which assets are listed. In one embodiment, each match that occurs is assigned a particular numeric value, and the matched values are added together to calculate a total "matched by" score. In one embodiment, a match on a vulnerability has a numeric value of 16, a match on network service banners has a numeric value of 8, a match on network service has a value of 4, a match on port has a value of 2, and a match on operating system has a value of 1. In this embodiment, a match on all five attributes results in a total "matched by" score of 31. In one embodiment, the "matched by" information is stored internally as a series of 5 bits, and the threat correlation module 104 uses bit arithmetic to set and clear each bit as necessary.

Following is one example illustrating, in one embodiment, how the foregoing "matched by" weighting can determine the order in which assets are displayed. Assuming that two assets, A and B, have equal risk scores of 50, the threat correlation module 104, in one embodiment, sorts them by their respective "matched by" scores. Assuming that asset A matches on vulnerability but nothing else, asset A has a "matched by" score of 16. Assuming that asset B matches on all attributes except vulnerability, asset B has a "matched by" score of 15. In this case, in an embodiment in which the matched-by scores are sorted in descending order, asset A will appear before asset B in the affected asset list.

Advantageously, in one embodiment, the affected asset list 212 is sorted such that the highest risk assets, as indicated by the asset risk score 214, are displayed at the top of the list, such that the user can more quickly recognize and attempt to remediate the security flaws found in the assets that are at higher risk and therefore pose a greater security threat to the network as a whole. In one embodiment, the list is secondarily sorted by a level of confidence that the asset is affected by the threat, as indicated by the "matched by" score.

In one embodiment, the calculated risk score 214 is based on the asset's criticality, the threat's criticality, and vulnerability severity values associated with the asset. In one embodiment, the asset criticality is a numeric ranking from 1 to 5, with 5 being the highest ranking, or most critical asset. In one embodiment, when an asset criticality is not defined, it is assigned an asset criticality of 1. In one embodiment, the threat criticality is a numeric ranking from 0 to 10, with 10 being the highest criticality, or most risky threat. In one embodiment, the vulnerability severity values are numeric rankings from 0 to 10, with the most severe vulnerabilities having a ranking of 10. An asset may be affected by more than one vulnerability, and in one embodiment the calculation of the risk score 214 takes into account all of the associated vulnerabilities' severity values. The foregoing rankings are combined according to a formula to calculate an overall risk score from 1 to 100, with 100 representing an asset that is at the highest risk with respect to the chosen threat and 1 representing an asset that is at very little or no risk with respect to the chosen threat.

Specifically, in one embodiment, the risk score 214 is calculated as follows. In one embodiment, the asset criticality, the threat criticality, and the vulnerability severity value are normalized such that each has a normalized value from 0 to 1. In one embodiment, the asset criticality is normalized by subtracting 1 from the asset criticality and dividing the result by 4. In one embodiment, the threat criticality is normalized by dividing the threat criticality by 10. In one embodiment, the vulnerability severity value is normalized by subtracting 1 from the vulnerability severity value and dividing the result by 9. In one embodiment, after the foregoing values have been normalized, each normalized value is multiplied by a weight, and the weighted values are added together. A general formula for performing the foregoing calculation follows.

$$q = Xy(a) + Yu(t) + Zp(v)$$

where:

q is the weighted sum of the normalized asset criticality, the normalized threat criticality, and the normalized vulnerability severity value;

X is a constant representing the weight assigned to asset criticality;

Y is a constant representing the weight assigned to threat criticality;

Z is a constant representing the weight assigned to vulnerability severity value;

y(a) is a normalized asset criticality;

u(t) is a normalized threat criticality; and p(v) is a normalized vulnerability value.

In one embodiment, X is equal to 0.50, Y is equal to 0.15, and Z is equal to 0.35.

In one embodiment, after the weighted sum q of the normalized asset criticality, the normalized threat criticality, and the normalized vulnerability severity level has been calculated, a risk score r is calculated according to the formula $$r = 99q + 1$$

where:

r is the risk score; and q is the weighted sum of the normalized asset criticality, the normalized threat criticality, and the normalized vulnerability severity level.

A skilled artisan will appreciate, in light of this disclosure, that q can alternatively be multiplied by a number other than 99 to produce a risk score r that has a different scale.

In the foregoing embodiment, the calculated risk score 214 focuses on the security risk associated with each asset individually with respect to the single threat and a single vulnerability. In another embodiment, the calculated risk score 214 focuses on the security risk associated with each asset individually but incorporating all threats and all vulnerabilities that affect the asset. Such an asset-centric risk score that incorporates all threats and all vulnerabilities affecting the asset takes into account the same factors as the asset-centric risk score that focuses on a single threat only. In one embodiment, the same formula for calculating an asset-centric risk score is used. However, in one embodiment, the individual threat criticality and vulnerability severity values are aggregate values instead of values for a single threat or vulnerability. In one embodiment, the several vulnerability severity values are combined into one aggregate score, such as, for example, by computing an average vulnerability severity value, a weighted average vulnerability severity value, a median value of the several vulnerability severity values, or some other aggregate score. A skilled artisan will appreciate, in light of this disclosure, that there exist many ways to calculate an aggregate value from several individual values, and all such ways are within the scope of this disclosure. A skilled artisan will also appreciate, in light of this disclosure, that the same ways to calculate an aggregate threat criticality are available.

In an advantageous embodiment, the user can choose between viewing a risk score that focuses only on a chosen threat and a single vulnerability and viewing a more comprehensive risk score that accounts for all of the threats and vulnerabilities that affect a given asset.

Alternatively or additionally, risk scores can be calculated in a threat-centric fashion, such that the risk score indicates the level of risk posed by a single threat across an entire network, taking into account all assets affected by a specified threat. A threat-centric risk score, in one embodiment, takes into account the three basic factors disclosed with regard to asset-centric risk scores. Advantageously, a threat-centric risk score allows an administrator to focus on security threats that have a large impact across the entire network, and to focus resources to eliminate threats that affect several assets or threaten highly critical assets.

Alternatively or additionally, the threat correlation module 104 can also calculate an aggregate organizational risk index that incorporates all of the vulnerabilities and threats across an entire organization, such as for the entire network. As has been indicated, the threat correlation module 104 correlates, among other things, threats with assets based on matching vulnerabilities. As has been indicated, each threat may have associated vulnerabilities, where associated vulnerabilities indicate that an asset may be more highly susceptible to the particular threat if the asset has the associated vulnerability. Also as indicated, each threat has different levels of risk. In one embodiment, threat risk levels may be classified into groups, such as, for example, high risk threats, medium risk threats, and low risk threats.

In one preferred embodiment, an organizational risk index takes into account a number of high risk threats that have an associated vulnerability that has been discovered by a current scan to exist within the organization, a number of medium risk threats that have an associated vulnerability that has been discovered by a current scan to exist within the organization, a number of low risk threats that have an associated vulnerability that has been discovered by a current scan to exist within the organization, a total number of threats, and an overall organizational vulnerability risk rating. In one embodiment, the overall organizational vulnerability risk rating used is a risk rating developed by Foundstone, Inc. that is known by the name FoundScore®. The FoundScore® overall organizational risk rating takes into account asset criticality, risk rating for discovered vulnerabilities, resource type such as internal versus external, existence of non-essential network services, wireless access points, rogue applications, and trojan and backdoor services. The FoundScore® overall organizational risk rating is presented as a number from 0 to 100, with 0 being the highest vulnerability level. Embodiments of the FoundScore® overall organizational risk rating have been disclosed in detail in one or more of the above-identified applications or publications that have been incorporated by reference.

In one embodiment, the overall risk index is calculated according to the formula $$\text{Risk Index} = (100 - \text{FoundScore}) * (\text{Threat Index})$$

where

FoundScore is an overall organizational vulnerability risk rating as described above; and Threat Index is based on a number of high risk threats that have an associated vulnerability that has been discovered by a current scan to exist within the organization, a number of medium risk threats that have an associated vulnerability that has been discovered by a current scan to exist within the organization, a number of low risk threats that have an associated vulnerability that has been discovered by a current scan to exist within the organization, and a total number of threats.

In one embodiment, if the Threat Index is less than 1, the Threat Index is set to 1 for the purpose of calculating the Risk Index. In one embodiment, if the calculated Risk Index exceeds 100, then the Risk Index is set to 100. In one embodiment, the Risk Index can be displayed to a user either graphically or numerically as a raw Risk Index score from 0 to 100.

In one embodiment, a risk severity rating can be displayed that is based on the Risk Index but that has fewer than 101 levels of risk. For example, a five level severity rating can be displayed, with a severe risk rating representing any Risk Index score from 80 to 100, a high risk rating representing any Risk Index score from 60 to 79, a medium risk rating representing any Risk Index score from 40 to 59, a minor risk rating representing any Risk Index score from 20 to 39, and a low risk rating representing any Risk Index score from 0 to 19. A skilled artisan will appreciate, in light of this disclosure, that any level of risk ratings may be provided, such as, for example, a risk rating with 2 levels, 3 levels, 4 levels, between 6 and 10 levels, between 11 and 20 levels, between 21 and 30 levels, and anything above 30 levels.

As indicated with respect to the foregoing formula, the Threat Index is based on a number of high risk threats that have an associated vulnerability that has been discovered by a current scan to exist within the organization, a number of medium risk threats that have an associated vulnerability that has been discovered by a current scan to exist within the organization, a number of low risk threats that have an associated vulnerability that has been discovered by a current scan to exist within the organization, and a total number of threats. In one embodiment, the Threat Index is calculated according to the formula $$ThreatIndex = \frac{5Nh + 3Nm + Nl}{TotalThreats}$$

where

Nh is the number of high risk threats that have an associated vulnerability that has been discovered by a current scan to exist within the organization;

Nm is the number of medium risk threats that have an associated vulnerability that has been discovered by a current scan to exist within the organization;

Nl is the number of low risk threats that have an associated vulnerability that has been discovered by a current scan to exist within the organization; and TotalThreats is the total number of threats that have been recently identified by threat intelligence alerts.

As indicated, the Threat Index formula, in one embodiment, is calculated based on threats that have been recently identified and vulnerabilities that have been discovered by a current scan. In one embodiment, recently identified threats include threats that have been identified in a threat intelligence alert within the last 90 days. Alternatively, recently identified threats can be threats that have been identified in a threat intelligence alert within the last week, last month, last 45 days, last 60 days, last 120 days, last 180 days, or the like. In one embodiment, a current scan includes the last scan performed by the vulnerability scanner 106. Alternatively, a current scan can include any scan that has been performed in the last week, last month, last 45 days, last 60 days, last 90 days, last 120 days, last 180 days, or the like.

Additionally, in one embodiment, the threat correlation module 104 allows a user to specify a subset of the network, such as, for example, by specifying all of the assets of a certain department, such as the web publishing department responsible for maintaining the organizational web site, and to calculate an aggregate risk score for the selected subset of assets that incorporates all of the assets, vulnerabilities, and threats associated with the selected assets.

A skilled artisan will appreciate, in light of this disclosure, that the foregoing ranking systems and weights can be altered without departing from the principles of the invention. The calculated risk score need not be based on a scale of 0 to 100, nor do the individual components of the score need to be based on scales from 1 to 5, 0 to 10, and 0 to 10, respectively. The calculated risk score, for example, can be implemented as a letter grade, with A being low risk, and F being the lowest risk. A skilled artisan will appreciate, in light of this disclosure, that any ranking system that categorizes the assets into multiple levels of risk is useful for alerting a user about the highest risk security problems on a network. Any of the many risk scoring systems that are understood by a skilled artisan in light of the foregoing principles are encompassed by this disclosure.

Advantageously, correlating threats to detected vulnerabilities and displaying results of the correlation allow an administrator to quickly and effectively prioritize vulnerabilities in a computer network that should be remediated first. Because, in advantageous embodiments, the threat correlation module 104 lists assets according to their level of risk, if an administrator remediates the vulnerabilities in the order presented, he or she will first take the remediation steps that will most significantly improve the overall security of the network. This advantageously allows an administrator to be more effective in his or her responsibilities even with the limited time and resources of many administrators. Additionally, according to the foregoing embodiments, the threat correlation module 104 can effectively communicate to an administrator, who may not be an expert on network vulnerabilities and threats, those vulnerabilities and threats that, based on expert knowledge, are most threatening. While preferred embodiments achieve the foregoing and other advantages, these advantages are not a necessary feature of every embodiment of the invention.

Figure 3:
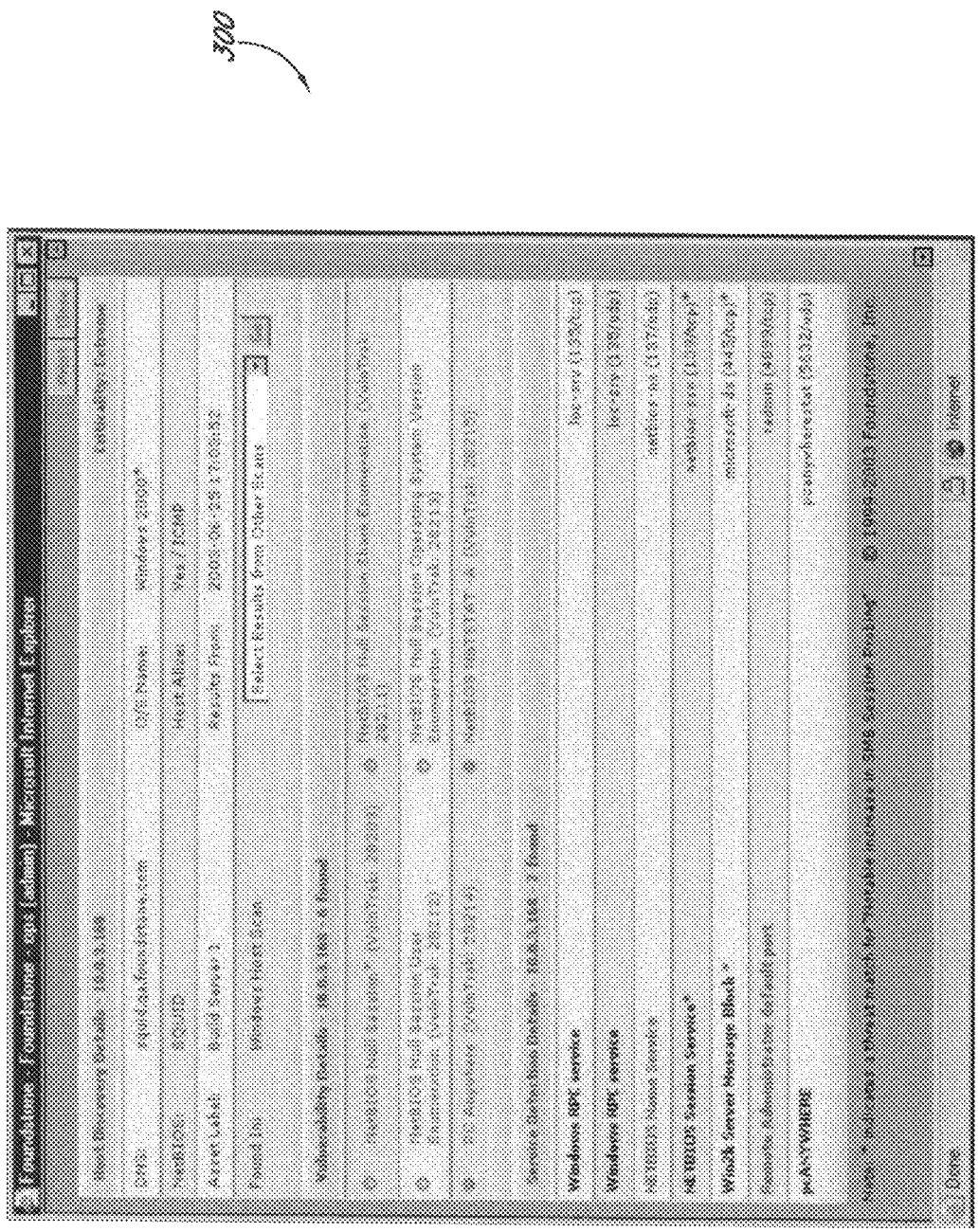
FIG. 3 is a screen shot illustrating a display screen produced by one embodiment of the security risk management system of FIG. 1 that shows in detail certain attributes of an asset affected by a security threat.

Advantageously, the information displayed by the threat correlation module 104 about each affected asset enables a user to take action to respond to one or more threats that affect an asset. In one embodiment, the threat correlation module 104 allows a user to select a particular asset and request additional details about the asset. FIG. 3 is a screen shot of an asset additional information display 300 that is displayed, according to one embodiment, when a user requests more detailed information. In one embodiment, the security risk management tools 108, which are now described, provide additional mechanisms for managing and responding to threats.

Figure 4:
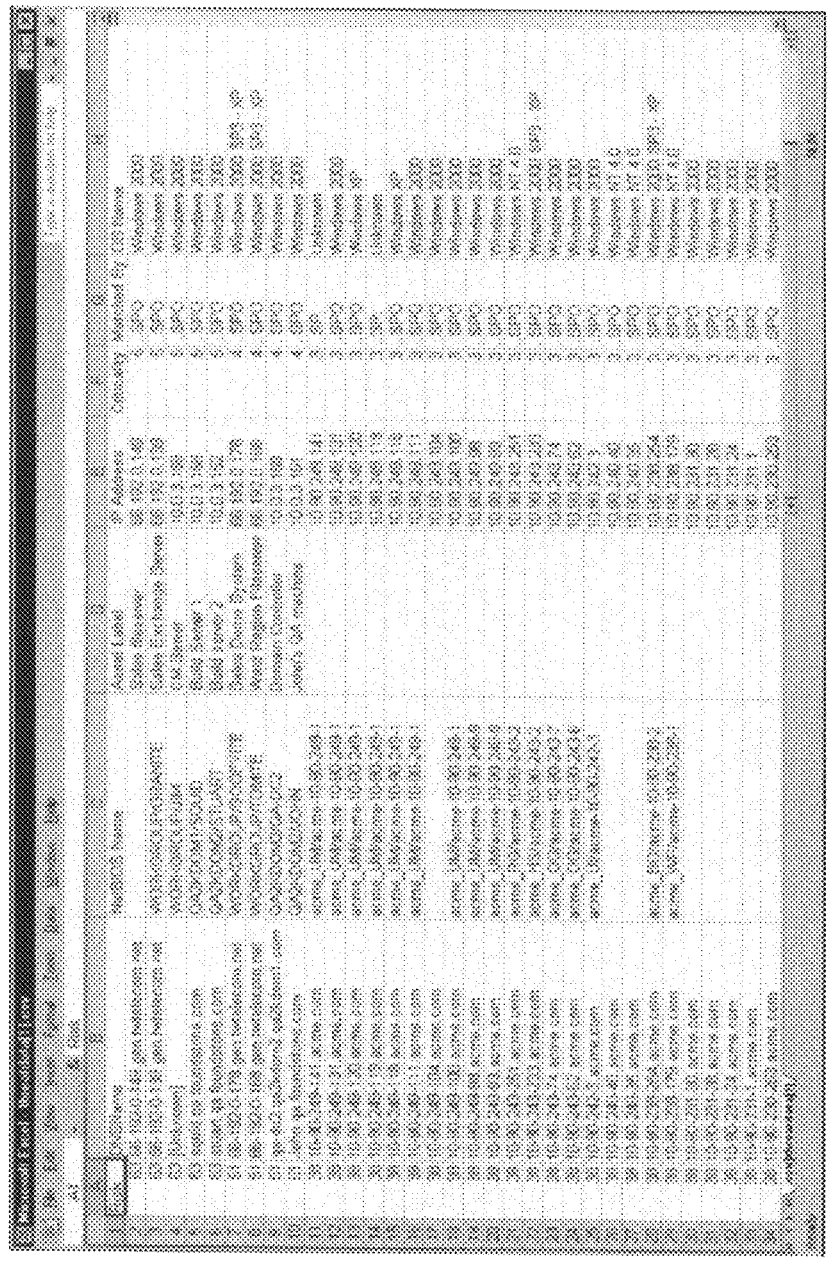
FIG. 4 is a screen shot illustrating a comma-separated value file including the results of a download of data related to affected assets produced by one embodiment of the security risk management system of FIG. 1.

In one embodiment, the security risk management tools 108 include a threat response module 126. In one embodiment, the threat response module 126 provides information and tools that enable a system administrator to take effective actions to remediate any security flaws that cause an asset to be affected by a threat. Advantageously, a system administrator, using the threat response module 126, can take preventive action before a threat becomes an actual exploit, potentially preventing serious harm to the network. In one embodiment, the threat response module 126 provides an affected asset list download control 228 (FIG. 2). In one embodiment, when a user activates the affected asset list download control 228, the threat response module 126 commences a download of the affected asset list to the user. In one embodiment, the affected asset list is downloaded into a comma-separated value ("CSV") file. A skilled artisan will appreciate, in light of this disclosure, that any number of other file formats can be supported. Advantageously, CSV files can typically be imported into a large number of application programs, such as, for example, Microsoft Excel. FIG. 4 is a screen shot of a downloaded affected asset list CSV file 400, as displayed by Microsoft Excel.

Advantageously, downloaded affected asset data can be used for immediate scans or patch management systems. Immediate scans are scans that can be launched directly from the threat correlation module 104 itself without having to perform typical scan configuration tasks. The scan can be pre-configured for the end user using the threat information, affected asset list, and a series of system defaults. Advantageously, by using an immediate scan, the user can quickly know exactly what assets are affected at the current moment. Thus, the user is provided information related to potential threat impact that is as up-to-date as possible. Patch management systems allow automated distribution and application of software patches or fixes across a network to all applicable hosts. By using the affected asset list produced by the threat correlation module 104, customers with patch management systems can load this list into the system and distribute fixes to the affected assets before they can be adversely affected by the threat event.

Additionally, in one embodiment, the threat response module 126 allows a user to access threat response recommendations. Each threat response recommendation includes textual instructions to a system administrator for responding to the threat in order to prevent, or minimize the likelihood of, exploits related to the threat. Additionally, in one embodiment, each threat response recommendation can include graphical elements, such as diagrams, charts, animations, and the like. In an advantageous embodiment, the threat response recommendations can be stored along with other threat related information in the threat intelligence database 116, and can be delivered to the threat correlation module 104 along with a threat intelligence alert 117. Alternatively or additionally, the threat intelligence communication module 114 can transmit threat response recommendations to the threat correlation module 104 upon receiving a user request for threat response recommendations concerning the threat that the user has selected.

In one embodiment, the threat response module 126 provides user access to a vulnerability remediation module 127. In one embodiment, the vulnerability remediation module 127 provides automated ticketing and workflow that manages remediation activities, such as by, for example, assigning particular users or groups specific remediation tasks, following up to determine if such tasks have been completed, routing tasks to additional users if remediation requires the assistance of multiple users, and commencing check up vulnerability scans to verify that remediation has occurred. Embodiments of the vulnerability remediation module 127 have the features of the embodiments of a vulnerability remediation module that are described in one or more of the above-identified applications or publications that have been incorporated by reference.

In one embodiment, the security risk management tools 108 include a compliance tracking module 128. In one embodiment, the compliance tracking module 128 allows a system administrator to track, over time, the success of remediation efforts regarding a particular threat. In one embodiment, the success of remediation efforts is deemed to correspond to the percentage of total assets that are potentially affected by a threat but that are not actually susceptible to a threat (e.g., assets for which remediation efforts have successfully protected them). Because the foregoing measurement is a percentage, in this embodiment, the compliance measurement is expressed from 0 to 100, where 100 is complete compliance (all potentially affected assets have been protected by preventative action) and 0 is complete non-compliance. In an advantageous embodiment, the compliance tracking module 128 allows a user to establish time-based compliance goals and to define a group of assets that the compliance tracking module 128 will track to determine if the goals have been and are being met. For example, according to this embodiment, a user can specify that 50% of web server assets should not be susceptible to Worm A within one week, that 75% of the same assets should be non-susceptible within two weeks, and that 100% of the same assets should be non-susceptible within three weeks. In one embodiment, the compliance tracking module 128 provides a user interface for receiving such compliance goals and stores the user-entered compliance goals for future tracking.

Figure 5:
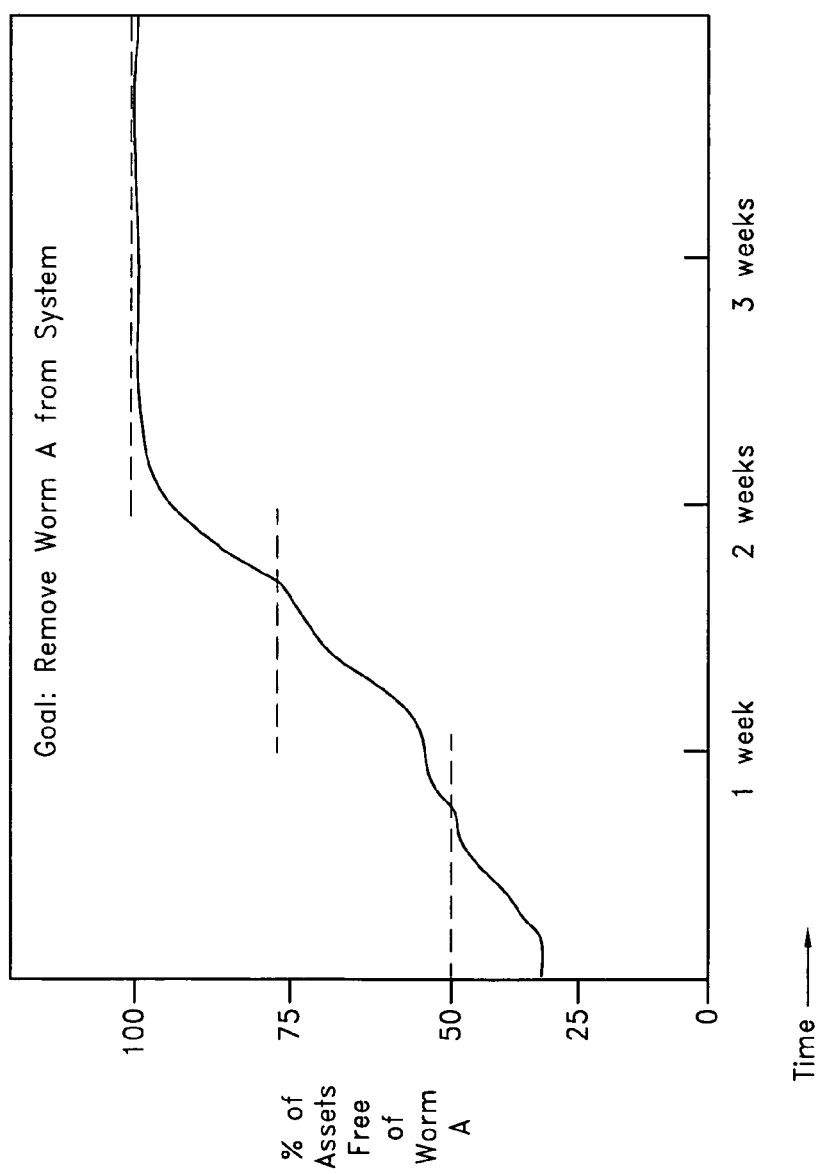
FIG. 5 is an exemplary compliance tracking graph produced by one embodiment of the security risk management system of FIG. 1.

In one embodiment, the compliance tracking module 128 tracks each compliance goal over time. In one embodiment, the compliance tracking module 128 calculates a compliance measurement by dividing the non-susceptible assets by the total number of assets in the asset group and multiplying the result by 100 to achieve a percentage-based measurement. In one embodiment, the compliance tracking module 128 performs this calculation periodically and stores the results so that it can display historical compliance results to a user. Alternatively or additionally, the compliance tracking module 128 can store historical records of the number of compliant and non-compliant assets, such that a percentage can be calculated from this data at any time. Upon receiving a request from a user for a compliance report for a specific threat, the compliance tracking module 128 retrieves or calculates historical results and displays the results in a tabular or graphical format. FIG. 5 is an exemplary display, in graphical form, of such results, representing a hypothetical organization's compliance with its goal of protecting its assets from Worm A over a three week period, with 50% of assets protected within one week, 75% of assets protected within two weeks, and 100% of assets protected within three weeks. In the illustration, dashed lines indicate the goal level and solid lines indicate the actual compliance measurement, as calculated by the compliance tracking module 128.

Alternatively or additionally, the compliance tracking module 128 can track compliance across an entire organization, including within the compliance measurement all assets and all threats. Alternatively or additionally, the compliance tracking module 128 can track compliance across a user-defined subset of all assets and all threats, such that, for example, a user can specify which threats and which assets are to be tracked. Alternatively or additionally, the compliance tracking module 128 can track compliance for a single asset, meaning that it can calculate the percentage of threats on a single asset that have been successfully remediated.

Advantageously, the use of percentage-based compliance tracking provides a measurement of compliance that can be expected to be intuitive to most administrators. Nevertheless, while percentage-based compliance measurements are expected to be intuitive and advantageous, other compliance measurements can be supported by the compliance tracking module 128 without departing from the scope of the invention. For example, a compliance measurement can be scaled to be a rating from 0 to 10, or 0 to any other number, or the like. Alternatively, a compliance measurement can be expressed as a letter grade, such as A for excellent compliance to F for a failure of compliance. A skilled artisan will appreciate, in light of this disclosure, that a great number of ranking systems exist that can be successfully adapted for use as a compliance measurement. All such compliance measurements are within the scope of this disclosure.

In one embodiment, the security risk management tools 108 include an asset classification module 130. Embodiments of the asset classification module 130 have previously been described.

In one embodiment, the security risk management tools 108 include a threat update module 136. In one embodiment, the threat update module 136 provides a threat update control. In one embodiment, when a user activates the threat update control, the threat update module 136 communicates with the vulnerability scanner 106 and causes the vulnerability scanner 106 to run a scan against the assets listed in the threat correlation results and update the assets' attributes so that any subsequent threat event correlation will use the most up-to-date asset inventory data. Advantageously, this feature provides the user with current, immediate threat exposure status. In one embodiment, the threat update module 136 can be configured to automatically request a threat update scan when either the threat is of a high criticality or the assets potentially affected by the scan are highly-critical assets. As has been discussed, the determination of what criticality threshold constitutes "highly-critical" so as to trigger such an automatic threat update scan may be resolved by the security risk management system 102 alone, by the user alone, or by the security risk management system 102 based on limited input from the user.

Figure 6:
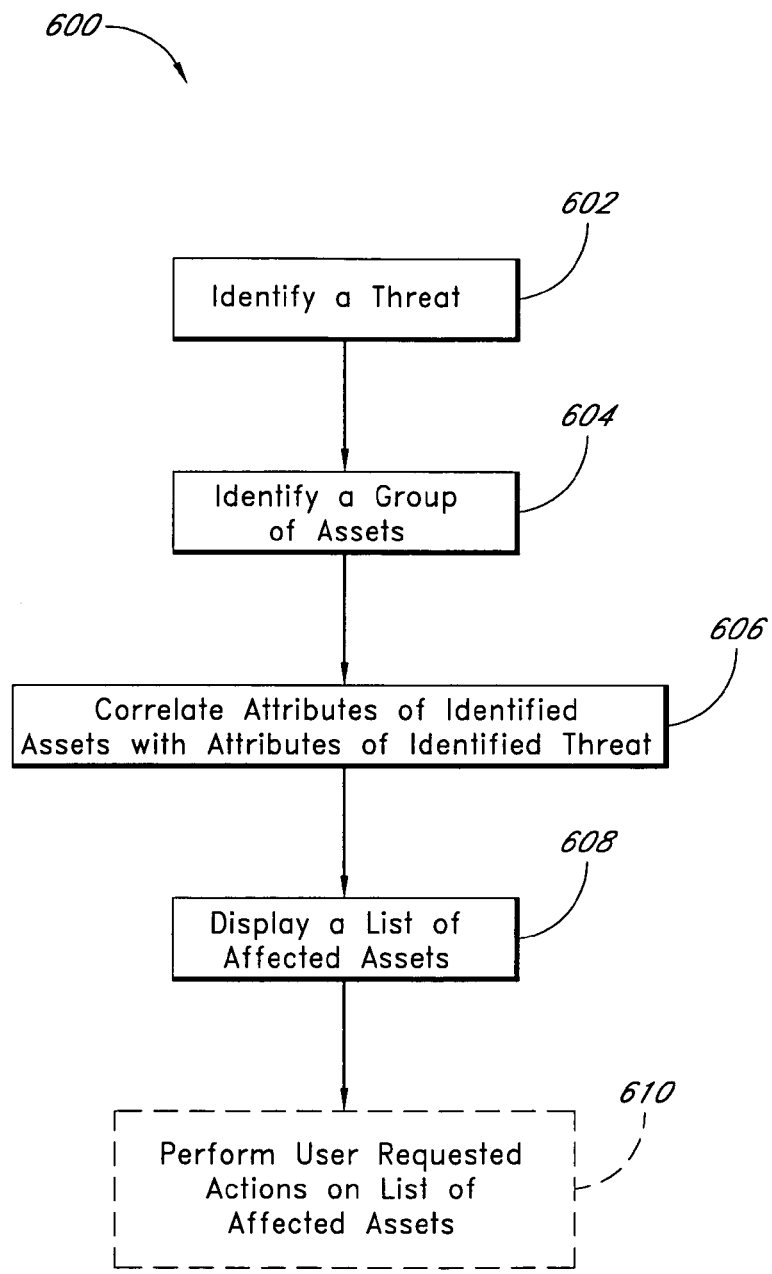
FIG. 6 is a flowchart illustrating a process of correlating threat attributes with asset attributes that is performed by one embodiment of the security risk management system of FIG. 1.

FIG. 6 is a flowchart illustrating a process 600 of correlating threats with actual vulnerabilities of assets as is executed by one embodiment of the threat correlation module 104. In a block 602, a threat is identified. In one embodiment, the threat is identified by a user who selects a threat from a list of threats. In one embodiment, the list of threats available to the user for selection is derived from a threat intelligence alert 117.

In a block 604, a group of assets to be correlated with the identified threat is identified. In one embodiment, the identified assets include those assets that, based on asset attributes and identified threat attributes, can potentially be affected by the identified threat. In one embodiment, the identified assets include assets identified by a user. In one embodiment, the identified assets include assets identified by a user that also can potentially be affected by the identified threat. In one embodiment, the identified assets include all assets on the network.

In a block 606, the identified assets are correlated with the identified threat. In one embodiment, the correlation includes comparing attributes of the identified assets with attributes of the identified threat. Each attribute of an asset that matches an attribute of the threat increases the likelihood that the asset is susceptible to the threat. Each attribute that is deemed to be susceptible to the threat, either because its attributes exactly match the attributes of the threat, or because its attributes match closely enough to establish a high confidence level of susceptibility, are added to a list of assets that are actually susceptible to the threat.

In a block 608, the results of the correlation are displayed. In one embodiment, a list of assets that are susceptible to the threat is displayed. In one embodiment, the display includes information about each susceptible asset, including, for example, a user-recognizable asset label, a risk level, an IP address, an asset criticality, matched by information, operating system information, a list of vulnerabilities of the asset, and the like. In one embodiment, the list is sorted such that the assets with the highest risk scores (most risky) are displayed at the top of the list.

In an optional block 610, a user-requested action is performed on the results of the correlation. In one embodiment, compliance tracking information is calculated. In one embodiment, a threat response is initiated, such as for example, displaying remediation information to a user, or commencing an automated ticketing and workflow remediation process. In one embodiment, an request is send to a vulnerability scanner for initiating an immediate threat update in order to update the affected assets attributes.

While preferred embodiments have been disclosed, the invention is not limited to the preferred embodiments only. A skilled artisan will appreciate, in light of this disclosure, how to implement, in addition to the disclosed embodiments, other alternative embodiments that incorporate some or all of the features and advantages of the disclosed embodiments. A skilled artisan will also appreciate, in light of this disclosure, how to implement, in addition to the disclosed embodiments, other alternative embodiments by combining some or all of the features and advantages of one disclosed embodiment with some or all of the features of another disclosed embodiment. This disclosure encompasses all such embodiments, and any other embodiment that is understood by a skilled artisan in light of this disclosure. The claims alone, and nothing else within this disclosure, set forth the scope of the invention.

What is claimed is:

1. A security risk management system, comprising:
a processor and a memory;
a vulnerability database comprising data indicative of security vulnerabilities possessed by each asset of a plurality of assets connected to a computer network;
an asset database comprising data indicative of attributes possessed by each asset of the plurality of assets such that the vulnerability database and the asset database together define for each asset a group of security vulnerabilities and attributes possessed by each asset; and
a threat correlation module in communication with the vulnerability database and the asset database and configured to:
receive at least one threat intelligence alert that comprises data identifying at least one security threat that affects a class of assets, wherein the threat intelligence alert defines the affected class of assets with reference to an associated group of attributes and security vulnerabilities possessed by the affected class of assets;
identify a selected threat from the at least one security threat identified by the at least one threat intelligence alert;
identify any assets affected by the selected threat, wherein the asset is deemed to be affected by the selected threat if the group of attributes and security vulnerabilities associated with the selected threat matches the group of attributes and security vulnerabilities possessed by the asset, wherein a user recommendation is provided for responding to the selected threat;
generate a prioritized list of the affected assets based on their respective security risks such that scanning activities are initiated for at least some of the affected assets based on their respective security risks; and
communicate with a threat response module configured to access a vulnerability remediation module and to initiate a ticketing and workflow process that at least partially directs remediation of asset vulnerabilities, wherein the ticketing and workflow process assigns at least one user at least one specific remediation task, and initiates a check-up vulnerability scan in order to verify that the remediation has occurred.

2. The security risk management system of claim 1, wherein the threat correlation module is further configured to display information about each affected asset including a risk score representative of a level of risk to which the asset exposes the network.

3. The security risk management system of claim 2, wherein the risk score of each asset is based at least on a criticality of the asset, a vulnerability severity ranking for each vulnerability associated with the asset, and a criticality of the threats that affect the asset.

4. The security risk management system of claim 1, wherein the threat response module is further configured to transmit to the user, in response to receiving a download request, a file that includes information related to the affected assets.

5. The security risk management system of claim 1, wherein the compliance goal and the time-based compliance measurement are expressed as a percentage of assets not affected by the threat.

6. The security risk management system of claim 1, wherein the compliance goal and the time-based compliance measurement are expressed as a raw number of assets not affected by the threat.

7. The security risk management system of claim 1, wherein the data in the vulnerability database includes:
   an identification of the asset;
   an identification of the vulnerability;
   open ports on the asset;
   an operating system running on the asset;
   an IP address of the asset;
   a domain name for the asset;
   a NetBIOS name; and
   a Windows Domain/Workgroup name.

8. The security risk management system of claim 1, wherein the attributes possessed by each asset of the plurality of assets comprise:
   an IP address;
   open ports on the asset;
   banners produced by the asset;
   an operating system run by the asset;
   a criticality of the asset;
   services run on the asset;
   an asset group to which the asset belongs;
   a human understandable asset label;
   an asset owner; and
   a geographical asset location.

9. The security risk management system of claim 1, wherein a success of the remediation is defined in terms of a percentage.

10. The security risk management system of claim 9, wherein a remediation goal is defined for use with the percentage in order to determine whether the remediation goal has been met.

11. The security risk management system of claim 1, wherein the security risk management system is operable such that the at least one threat intelligence alert is initiated immediately from a threat intelligence communication module after an urgent threat has been added to a threat intelligence database.

12. The security risk management system of claim 11, wherein the at least one threat intelligence alert is received from the threat intelligence communication module by the threat correlation module which stores the at least one threat intelligence alert into a local threat intelligence database.

13. A method of correlating a conceptual network security threat with assets that can be affected by the conceptual network security threat, the method comprising:
   identifying a selected conceptual network security threat, wherein the selected conceptual network security threat defines a group of attributes and vulnerabilities that, if possessed by an asset, indicate that the asset possessing the group of attributes and vulnerabilities can be affected by the selected threat if the threat becomes a realized threat;
   identifying a group of assets for comparison;
   comparing attributes and vulnerabilities associated with each asset of the group of assets with attributes and vulnerabilities of the selected threat utilizing a threat correlation module;
   generating a prioritized list of the affected assets based on their respective security risks such that scanning activities are initiated for at least some of the affected assets based on their respective security risks; and
   displaying the list of affected assets comprising each asset whose attributes and vulnerabilities match the attributes and vulnerabilities of the selected threat;
   wherein the threat correlation module is in communication with a threat response module configured to access a vulnerability remediation module and initiate an automated ticketing and workflow process that at least partially directs remediation of asset vulnerabilities, the automated ticketing and workflow process automatically assigning at least one user at least one specific remediation task, determining if the at least one specific remediation task has been completed by the at least one user, and commencing a check-up vulnerability scan to verify that the remediation has occurred, wherein a user recommendation is provided for responding to the selected conceptual network security threat.

14. The method of claim 13, wherein the list of affected assets comprises each asset whose attributes and vulnerabilities partially match the attributes and vulnerabilities of the selected threat.

15. The method of claim 13, wherein identifying a group of assets for comparison includes identifying a group of assets that, based on the vulnerabilities and attributes of the assets and the vulnerabilities and attributes of the selected threat can potentially be affected by the selected threat.

16. The method of claim 13, wherein displaying a list of affected assets includes displaying along with each affected asset a risk score representing a level of security risk posed by the affected asset to a computer network and wherein the list is sorted such that assets posing high security risk are presented near the top of the list.

* * * * *